(12) United States Patent
Sano

(10) Patent No.: US 9,121,763 B2
(45) Date of Patent: Sep. 1, 2015

(54) SPECTROMETER

(71) Applicant: Seiko Epson Corporation, Tokyo (JP)

(72) Inventor: Akira Sano, Shiojiri (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 14/196,529

(22) Filed: Mar. 4, 2014

(65) Prior Publication Data

US 2014/0253924 A1 Sep. 11, 2014

(30) Foreign Application Priority Data

Mar. 7, 2013 (JP) ................................. 2013-045072

(51) Int. Cl.
*G01J 3/28* (2006.01)
*G01J 3/26* (2006.01)

(52) U.S. Cl.
CPC ................. *G01J 3/2823* (2013.01); *G01J 3/26* (2013.01); *G01J 2003/2813* (2013.01); *G01J 2003/2826* (2013.01)

(58) Field of Classification Search
USPC ...................................... 356/72–73, 300–456
See application file for complete search history.

(56) References Cited

U.S. PATENT DOCUMENTS

| 2006/0181543 A1 | 8/2006 | Katsumata et al. | |
|---|---|---|---|
| 2007/0002276 A1 | 1/2007 | Hirohara et al. | |
| 2007/0163882 A1* | 7/2007 | Yamazaki et al. | 204/451 |
| 2008/0007691 A1 | 1/2008 | Mihashi et al. | |
| 2008/0007692 A1 | 1/2008 | Mihashi et al. | |

FOREIGN PATENT DOCUMENTS

| JP | 09-015046 | 1/1997 |
|---|---|---|
| JP | 10-311757 | 11/1998 |
| JP | 2001-159567 A | 6/2001 |
| JP | 2002-056798 A | 2/2002 |
| JP | 2004-286515 A | 10/2004 |
| JP | 2005-114531 A | 4/2005 |
| JP | 2006-158547 A | 6/2006 |
| JP | 2007-330557 A | 12/2007 |
| JP | 2007-330558 A | 12/2007 |
| JP | 2010-279454 A | 12/2010 |
| JP | 4756854 B2 | 8/2011 |
| WO | WO-98-19293 A1 | 5/1998 |
| WO | WO-02-086416 A2 | 10/2002 |

OTHER PUBLICATIONS

Extended European Search Report for Application No. EP 14 15 8042 dated Aug. 5, 2014 (8 pages).
Gottesfeld Brown, L., "A Survey of Image Registration Techniques", ACM, Computing Surveys, vol. 24, No. 4, Dec. 1992, pp. 325-376.
Baihua, Li et al., "Point Pattern Matching and Applications—A Review", Systems, Man and Cybernetics, 2003, IEEE International Conference on Systems, Man, and Cybernetics, IEEE, Piscataway, NJ, USA, vol. 1, Oct. 5, 2003, pp. 729-736.

* cited by examiner

*Primary Examiner* — Abdullahi Nur
(74) *Attorney, Agent, or Firm* — Harness, Dickey & Pierce, P.L.C.

(57) ABSTRACT

A spectrometer includes: a wavelength-variable interference filter that can change a wavelength of selected light and disperses light from a measurement target; an imaging unit that receives light components with a plurality of wavelengths which are dispersed by the wavelength-variable interference filter and acquires a plurality of spectral images; a positional deviation amount detection unit that selects a standard image from the plurality of spectral images acquired by the imaging unit and detects a positional deviation amount of a pixel position which receives light from a predetermined position of the measurement target between the standard image and at least one of the spectral images other than the standard image; and a position correction unit that positions the spectral images other than the standard image on the basis of the detected positional deviation amount.

20 Claims, 14 Drawing Sheets

ROW NUMBER 4

| COLUMN NUMBER | 1 | 2 | 3 | 4 | 5 | 6 |
|---|---|---|---|---|---|---|
| RECEIVED LIGHT INTENSITY | 2 | 0 | 8 | 6 | 4 | 2 |
| DIFFERENCE BETWEEN RECEIVED LIGHT INTENSITIES | | -2 | 8 | -2 | -2 | -2 |
| ABSOLUTE VALUE OF DIFFERENCE BETWEEN RECEIVED LIGHT INTENSITIES | | 2 | 8 | 2 | 2 | 2 |

| COLUMN NUMBER | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| RECEIVED LIGHT INTENSITY | 1 | 0 | 7 | 6 | 3 | 2 | 1 | 2 | 4 | 6 | 10 | 11 | 12 | 15 | 20 | 17 | 15 | 12 | 10 | 13 |
| DIFFERENCE BETWEEN RECEIVED LIGHT INTENSITIES | | -1 | 7 | -1 | -3 | -1 | -1 | 1 | 2 | 2 | 4 | 1 | 1 | 3 | 5 | -3 | -2 | -3 | -2 | 3 |
| DIFFERENCE BETWEEN ADJACENT RECEIVED LIGHT INTENSITY DIFFERENCES | | | 8 | -8 | 2 | 2 | 0 | 2 | 1 | 0 | 2 | -3 | 0 | 2 | 2 | -8 | 1 | -1 | 1 | 5 |

FIG.13

SPECTROMETER

BACKGROUND

1. Technical Field

The present invention relates to a spectrometer.

2. Related Art

A technique has been known which measures an image displayed on an image display device or an image on a printout and calculates spectral data for a desired position of the image.

For example, an image display device has been known which captures the image of a measurement target using a multiband camera, acquires a multiband image including band images corresponding to a plurality of bands, calculates spectral data for a position selected by the user using the band images of the multiband image, and displays the spectral data (JP-A-2005-114531).

However, in the technique disclosed in JP-A-2005-114531, when a plurality of band images, that is, spectral images corresponding to a plurality of wavelengths, are acquired, there is a concern that the position of the multiband camera will deviate from the object to be captured (measurement target). That is, when the spectral images are acquired at a plurality of wavelengths, it takes time for measurement. For the measurement period of time, positional deviation is likely to occur in the multiband camera due to, for example, hand shaking. As such, when positional deviation occurs in the multiband camera, measurement target light emitted from different positions of the measurement target is received at one pixel position and positional deviation occurs between the pixels in each spectral image, which makes it difficult to acquire spectral data for the measurement target with high accuracy.

SUMMARY

An advantage of some aspects of the invention is to provide a spectrometer which can prevent the influence of a relative positional deviation between the spectrometer and a measurement target even when the relative positional deviation occurs when a plurality of spectral images are acquired.

An aspect of the invention is directed to a spectrometer including: a spectral element that can change a wavelength of selected light and disperses light from an object; an imaging unit that receives light components with a plurality of wavelengths which are dispersed by the spectral element and acquires a plurality of spectral images; a positional deviation amount detection unit that selects a standard image from the plurality of spectral images acquired by the imaging unit and detects a positional deviation amount of a pixel position which receives light from a predetermined position of the object between the standard image and at least one of the spectral images other than the standard image; and a positioning unit that positions the spectral images other than the standard image on the basis of the positional deviation amount detected by the positional deviation amount detection unit.

The positioning includes calculating the positional deviation amount between the corresponding pixel positions such that corresponding positions between the spectral images, that is, the pixel positions which receive the measurement target light from a predetermined position of the measurement target, are aligned with each other and correcting the coordinates of each pixel in one of the spectral images using the calculated positional deviation amount.

According to this configuration, the positional deviation amount detection unit detects the positional deviation amount between the pixel positions of the spectral images and the positioning unit performs positioning between the spectral images. Therefore, even when the positional deviation between the pixel positions of the spectral images occurs due to a change in the positional relationship between the measurement target and the spectrometer during the acquisition of a plurality of spectral images, positioning is performed between the spectral images to prevent the influence of the positional deviation. For example, it is possible to measure colors with high accuracy or to acquire a high-accuracy multiband image.

In the spectrometer according to the aspect of the invention, it is preferable that the positional deviation amount detection unit includes a positioning point selection unit that selects, as a positioning point, the pixel position which receives light from the predetermined position, on the basis of received light intensity of each pixel in the spectral image and a positional deviation amount measurement unit that measures a positional deviation amount between the positioning point in the standard image and the positioning points in the spectral images other than the standard image.

According to this configuration, the positioning point selection unit selects the positioning point on the basis of the received light intensity of the spectral image. The positional deviation amount measurement unit detects the positional deviation amount between the positioning points in the spectral images. Therefore, since the positioning point in each spectral image and the positional deviation amount between the positioning points are detected, for example, the positioning point in one spectral image is aligned with the positioning points in the other spectral images to align the pixel positions of the spectral images.

Since the positioning point or the positional deviation amount is detected on the basis of the received light intensity of the acquired spectral image, for example, it is not necessary to provide a member, such as a sensor for detecting the positional deviation amount, and the configuration of the spectrometer is simplified.

In the spectrometer according to the aspect of the invention, it is preferable that the positioning point selection unit selects, as the positioning point, a pixel with the highest received light intensity in each spectral image.

According to this configuration, the pixel with the highest received light intensity is selected as the positioning point. Here, a point with the highest received light intensity is likely to be a bright point. At the bright point, the amount of light is large at a plurality of wavelengths. Therefore, when the point with the highest received light intensity is used as the positioning point, it is possible to select the same positioning point in a wide wavelength range and to improve the accuracy of positioning.

In the spectrometer according to the aspect of the invention, it is preferable that the positioning point selection unit selects, as the positioning point, a pixel with a received light intensity equal to or greater than a first predetermined threshold value in each spectral image.

According to this configuration, the pixel with a received light intensity equal to or greater than the first predetermined threshold value is selected as the positioning point. Therefore, it is possible to set a plurality of positioning points. When there are a plurality of bright points, a bright point with the largest amount of light is likely to vary depending on wavelength. In contrast, when a plurality of points that are equal to or greater than the threshold value are used as the positioning points, it is possible to further improve the accuracy of positioning.

In the spectrometer according to the aspect of the invention, it is preferable that the positioning point selection unit selects, as the positioning point, at least one of two pixels with the largest difference in the received light intensity therebetween in each spectral image.

According to this configuration, at least one of the two pixels with the largest difference in the received light intensity therebetween in each spectral image is selected as the positioning point. Here, between the pixels may be between adjacent pixels or between pixels which are arranged at an interval of one or two pixels. The pixels having the largest difference in received light intensity therebetween are pixels with the high rate of change in received light intensity therebetween, that is, an edge portion (outline portion) of the spectral image. The edge is likely to appear at the same position, regardless of the wavelength of the spectral image. When the edge portions are positioned, it is possible to perform positioning between the spectral images with high accuracy.

In the spectrometer according to the aspect of the invention, it is preferable that when a first pixel, a second pixel, and a third pixel are consecutively arranged in one direction, the positioning point selection unit calculates a difference value between a difference in received light intensity between the first pixel and the second pixel and a difference in received light intensity between the second pixel and the third pixel as an adjacent intensity difference in the second pixel, extracts pixels with the smallest adjacent intensity difference among the pixels which are arranged in the one direction in each spectral image, and selects a pixel with the highest received light intensity among the extracted pixels as the positioning point.

According to this configuration, among a plurality of pixels with the smallest adjacent intensity difference in one direction (for example, in a row direction or a column direction) of the spectral image, a pixel with the highest received light intensity is used as the positioning point. The pixel with the smallest adjacent intensity difference is likely to be an edge portion (outline) with a large light value. The pixel with the highest received light intensity in the edge portion is likely to be a pixel on the edge portion. Therefore, the pixel is likely to be a point with the large amount of light, regardless of wavelength, and is selected as the positioning point. As a result, it is possible to further improve the accuracy of positioning.

In the spectrometer according to the aspect of the invention, it is preferable that the positioning point selection unit selects a plurality of the positioning points, and the positioning unit performs positioning such that a sum of distances between a plurality of corresponding positioning points after the positioning is at a minimum.

According to this configuration, when the spectral images are positioned using a plurality of positioning points, the positioning between the spectral images is performed such that the sum of the distances between the corresponding positioning points after the positioning is the minimum.

When a change in the positional relationship between the measurement target and the spectrometer is a combination of various changes, such as an inclination change and a distance change, not all positioning points are aligned with each other only by two-dimensional movement (parallel movement or rotational movement). Therefore, when positioning between the spectral images is performed such that the sum of the distances between the positioning points is the minimum, it is possible to effectively perform optimal positioning, using only the positioning process using parallel movement and rotational movement.

In the spectrometer according to the aspect of the invention, it is preferable that the spectrometer further includes a designated position detection unit that detects a designated position in the spectral image. Preferably, the positioning unit performs positioning for the positioning point which is included in a predetermined region including the designated position of the spectral image.

According to this configuration, positioning is performed only for the positioning point which is included in a predetermined region, such as a measurement target region when the result of color measurement is calculated, that is, only for the predetermined region. For example, when position deviation involves a change in inclination with respect to the measurement target, in some cases, it is difficult to position the entire image. In the above-mentioned configuration, since positioning is performed only for a predetermined region, it is possible to perform positioning in the predetermined region with high accuracy.

In the spectrometer according to the aspect of the invention, it is preferable that the positional deviation amount detection unit detects the positional deviation amount between the spectral images in a predetermined wavelength range, and the positioning unit performs positioning between the spectral images in the predetermined wavelength range.

In some cases, it is difficult to detect a portion with high received light intensity common to the spectral images having a large difference in wavelength therebetween. In contrast, in the above-mentioned configuration, the positional deviation amount between the pixel positions of the spectral images in the predetermined wavelength band is detected and positioning is performed. Here, spectral images in the predetermined wavelength band described in the above-mentioned configuration indicate the spectral images having a wavelength difference of, for example, less than 50 nm and the term "in the predetermined wavelength band" means that positioning is performed between the spectral images with the wavelengths that are relatively close to each other.

As such, a common pixel with high received light intensity is likely to be detected between the spectral images with the wavelengths that are close to each other, which makes it possible to improve the accuracy of positioning.

In particular, when positioning is performed between the spectral images with the measured wavelengths which are closest to each other, it is possible to further improve the accuracy of positioning.

In the spectrometer according to the aspect of the invention, it is preferable that the positioning unit performs positioning for the spectral image with a positional deviation amount greater than a predetermined value.

Here, the predetermined value is appropriately set, according to, for example, the accuracy of measurement, a measurement target, and the specifications of the spectrometer.

According to this configuration, since positioning is performed for the spectral image with a positional deviation amount greater than the predetermined value, the image which does not require positioning is not positioned. Therefore, it is possible to reduce the amount of calculation for the positioning process. As a result, it is possible to reduce the processing load of the spectrometer and the processing time.

In the spectrometer according to the aspect of the invention, it is preferable that the spectrometer further includes: a display unit that displays an image; a display control unit that displays, on the display unit, a reference image obtained by composing the spectral images with at least three wavelengths which are acquired by the imaging unit; and a designated position detection unit that detects a designated position which is specified by an input operation of a user in the reference image displayed on the display unit. Preferably, the imaging unit acquires spectral images corresponding to a plurality of wavelengths in a region including the designated position. Preferably, the positional deviation amount detection unit detects the positional deviation amount between the standard image and a spectral image for generating the reference image, using at least one of the spectral image and the reference image as the standard image. Preferably, the positioning unit performs positioning for the spectral image on the basis of the detected positional deviation amount.

According to this configuration, when the user specifies the designated position to be measured, the spectral images for generating a reference image, which have at least three wavelengths, are acquired and the display control unit displays the reference image obtained by composing the spectral images for generating a reference image on the display unit. When the designated position detection unit detects the designated position corresponding to the input operation of the user, the spectral images with a plurality of wavelengths are acquired.

Therefore, since the spectral images corresponding to at least three wavelengths which are acquired in order to generate the reference image are composed, it is possible to display a reference image which is the same as or similar to the measurement target on the display unit. Then, the user selects the desired position while referring to the reference image displayed on the display unit. Therefore, it is possible to appropriately and easily select a desired position in the measurement target as the designated position.

In general, when the designated position is specified, positional deviation is likely to occur in the spectrometer since the user performs an operation.

According to this configuration, the positional deviation amount of the spectral image which is acquired after the designated position is selected with respect to the reference image which is displayed when the designated position is selected is detected and positioning is performed on the basis of the positional deviation amount. Therefore, it is possible to effectively perform positioning with high accuracy.

In the spectrometer according to the aspect of the invention, it is preferable that the display control unit displays, on the display unit, the reference image obtained by composing three spectral images for generating the reference image.

According to this configuration, in order to generate the reference image, the reference image obtained by composing three spectral images is displayed on the display unit. For example, one wavelength is selected from each of wavelength bands corresponding to R, G, and B colors, and spectral images with the three selected wavelengths are acquired. Then, the spectral images are composed to generate an image which is the same as or similar to the measurement target.

Since the spectral images with three wavelengths are composed into the reference image, it is possible to reduce the time required to capture the reference image. For example, when 50 reference images can be captured per second, the user can operate the spectrometer to display the reference image in real time while moving the spectrometer. The user can easily search for a measurement position.

In the spectrometer according to the aspect of the invention, it is preferable that the positional deviation amount detection unit acquires, as a representative image, the plurality of spectral images and/or a composite image of the spectral images and detects a positional deviation amount between the standard image and the representative image, and the positioning unit performs positioning for the spectral images on the basis of the detected positional deviation amount.

According to this configuration, the positional deviation amount between the representative image and the standard image is detected and positioning is performed for the spectral images on the basis of the detected positional deviation amount. Therefore, it is possible to reduce the amount of calculation required to detect the positional deviation amount, as compared to, for example, when the positional deviation amount between all spectral images and the standard image is detected in order to perform positioning. As a result, it is possible to effectively perform positioning.

In the spectrometer according to the aspect of the invention, it is preferable that the representative image is the spectral image which has substantially the same wavelength as the spectral image for generating the reference image.

According to this configuration, the positional deviation amount is detected on the basis of the spectral image which has the same wavelength as the spectral image for generating the reference image, which is to be positioned, or the spectral image which has a wavelength close to that of the spectral image for generating the reference image (for example, a wavelength difference of 10 nm) and then positioning is performed. Since the spectral image is substantially the same as or similar to the spectral image for generating the reference image, it is possible to perform positioning with high accuracy.

In the spectrometer according to the aspect of the invention, it is preferable that the representative image is a composite image of three spectral images which have substantially the same wavelengths as at least three spectral images for generating the reference image.

According to this configuration, similarly to the above-mentioned configuration, the positional deviation amount between the reference image and a composite image of the spectral images which has the same wavelength as the spectral images for generating the reference image, which is to be positioned, or the spectral images which have wavelengths close to those of the spectral images for generating the reference image is detected and then positioning is performed. In this case, the composite image and the reference image are the same images and are compared with each other to perform positioning. Therefore, it is possible to improve the accuracy of positioning.

In the spectrometer according to the aspect of the invention, it is preferable that the imaging unit sequentially acquires the plurality of spectral images, and the representative image is the spectral image which is initially acquired among the sequentially acquired spectral images.

According to this configuration, the positional deviation amount between the initially acquired spectral image (hereinafter, referred to as a first spectral image) among the sequentially acquired spectral images and the standard image is detected and positioning is performed.

As described above, when the designated position is specified, positional deviation is likely to occur in the spectrometer. In general, the time from the acquisition of the spectral images for generating the reference image to the acquisition of the first spectral image is longer than the interval at which each spectral image is acquired. As described above, the positional deviation amount between the first spectral image and the reference image is likely to be more than the positional deviation amount between the spectral images. Therefore, it is possible to prevent the influence of the positional deviation amount between the standard image and the first spectral image and to perform positioning with high accuracy.

In the spectrometer according to the aspect of the invention, it is preferable that the imaging unit acquires a comparative spectral image which has the same wavelength as the spectral image for generating the reference image after acquiring the plurality of spectral images, and the representative image is the comparative spectral image.

According to this configuration, the spectral image for generating the reference image is acquired before the designated position is specified, the comparative spectral image is acquired after the designated position is specified, and positioning is performed using the acquired images. Therefore, it is possible to perform positioning corresponding to the positional deviation amount before and after a designated position specification operation in which positional deviation is likely to occur. As a result, it is possible to perform positioning with high accuracy.

In the spectrometer according to the aspect of the invention, it is preferable that the imaging unit sequentially acquires the plurality of spectral images, the positional deviation amount detection unit detects the positional deviation amount between the standard image and the spectral image which is initially acquired among the sequentially acquired spectral images and the positional deviation amount between the spectral image and the next spectral image which is acquired after the spectral image, and the positioning unit performs positioning between the standard image and the initially acquired spectral image and performs positioning between the spectral image and the next spectral image which is acquired after the spectral image for the spectral images which are acquired after the initially acquired spectral image.

According to this configuration, similarly to the above-mentioned configuration, the positional deviation amount between the first spectral image and the standard image is detected and positioning is performed. Therefore, it is possible to prevent the influence of the positional deviation amount between the standard image and the first spectral image and to perform positioning with high accuracy.

In addition, positioning is performed between the spectral image and the next acquired spectral image. Therefore, it is possible to reduce the positional deviation amount between the spectral images to be positioned and to improve the accuracy of positioning.

In particular, when the measured wavelength is changed to increase or decrease, the wavelengths of the spectral images to be positioned are close to each other. Therefore, for example, the position with the highest received light intensity or an edge portion is likely to be common to the spectral images. It is possible to further improve the accuracy of positioning.

In the spectrometer according to the aspect of the invention, it is preferable that the positioning unit calculates a position corresponding to the designated position in each spectral image on the basis of the positional deviation amount.

According to this configuration, when positioning is performed, the coordinates of the designated position in the reference image are corrected on the basis of the detected positional deviation amount and the coordinates of the designated position in the spectral image are calculated.

Therefore, only the coordinates of the designated position, which is a spectrometry target, are corrected, as compared to, for example, when the coordinate values of all pixel positions of the spectral image are positioned on the basis of the positional deviation amount. As a result, it is possible to reduce the amount of calculation in positioning and thus reduce a processing load.

In the spectrometer according to the aspect of the invention, it is preferable that the positional deviation amount detection unit includes a position change detection unit that detects a change in a position relative to a measurement target, and detects the positional deviation amount on the basis of the change in the position.

Since the position change detection unit which detects the change in the position relative to the measurement target detects a position change, it is possible to perform positioning with high accuracy on the basis of the detection result.

In the spectrometer according to the aspect of the invention, it is preferable that the position change detection unit is an angle variation detection unit that detects a variation in an angle with respect to the measurement target.

The angle variation detection unit may detect a change in the angle of a light receiving surface of a light receiving element with respect to the measurement target.

When the angle of the spectrometer with respect to the measurement target is changed, there may be a case in which the spectral image after the change is smaller than the spectral image before the change. However, when the spectral images are analyzed to detect the positional deviation between the spectral images, it is not easy to detect the change in the angle.

In contrast, according to the above-mentioned configuration, since the angle variation detection unit is used as the position change detection unit, it is possible to detect a variation in the angle with respect to the measurement target. Therefore, it is possible to perform positioning, considering a change in the angle, and to improve the accuracy of positioning.

In particular, only the angle variation detection unit which can detect an angle variation is provided as the position change detection unit and positioning is performed using the positioning point for positional deviation in the plane direction parallel to the measurement target. Therefore, it is possible to accurately perform positioning with a simple configuration and to provide a high-performance spectrometer at a low cost.

In the spectrometer according to the aspect of the invention, it is preferable that the spectrometer further includes a spectrum generation unit that generates spectral data from the spectral images corresponding to a plurality of wavelengths.

According to this configuration, it is possible to perform positioning with high accuracy. Therefore, it is possible to provide high-accuracy spectral data.

In the spectrometer according to the aspect of the invention, it is preferable that the spectral element is a wavelength-variable Fabry-Perot etalon.

According to this configuration, as a spectral filter, the wavelength-variable Fabry-Perot etalon is used which can extract light with a wavelength corresponding to a gap between a first reflective film provided on a first substrate and a second reflective film provided on a second substrate.

Therefore, the gap is changed to extract light components with a plurality of wavelengths in a short time. As a result, it is possible to reduce the measurement time. In addition, it is possible to reduce the size of the Fabry-Perot etalon, as compared to, for example, when an acousto-optic tunable filter (AOTF) or a liquid crystal tunable filter (LCTF) is used. Therefore, it is possible to reduce the size of the spectrometer.

BRIEF DESCRIPTION OF THE DRAWINGS

The invention will be described with reference to the accompanying drawings, wherein like numbers reference like elements.

FIG. 13 is a table illustrating the relationship between received light intensity and a positioning point.

DESCRIPTION OF EXEMPLARY EMBODIMENTS

First Embodiment

Hereinafter, a first embodiment of a spectrometer according to the invention will be described with reference to the drawings.

Configuration of Color Measurement System

Figure 1:
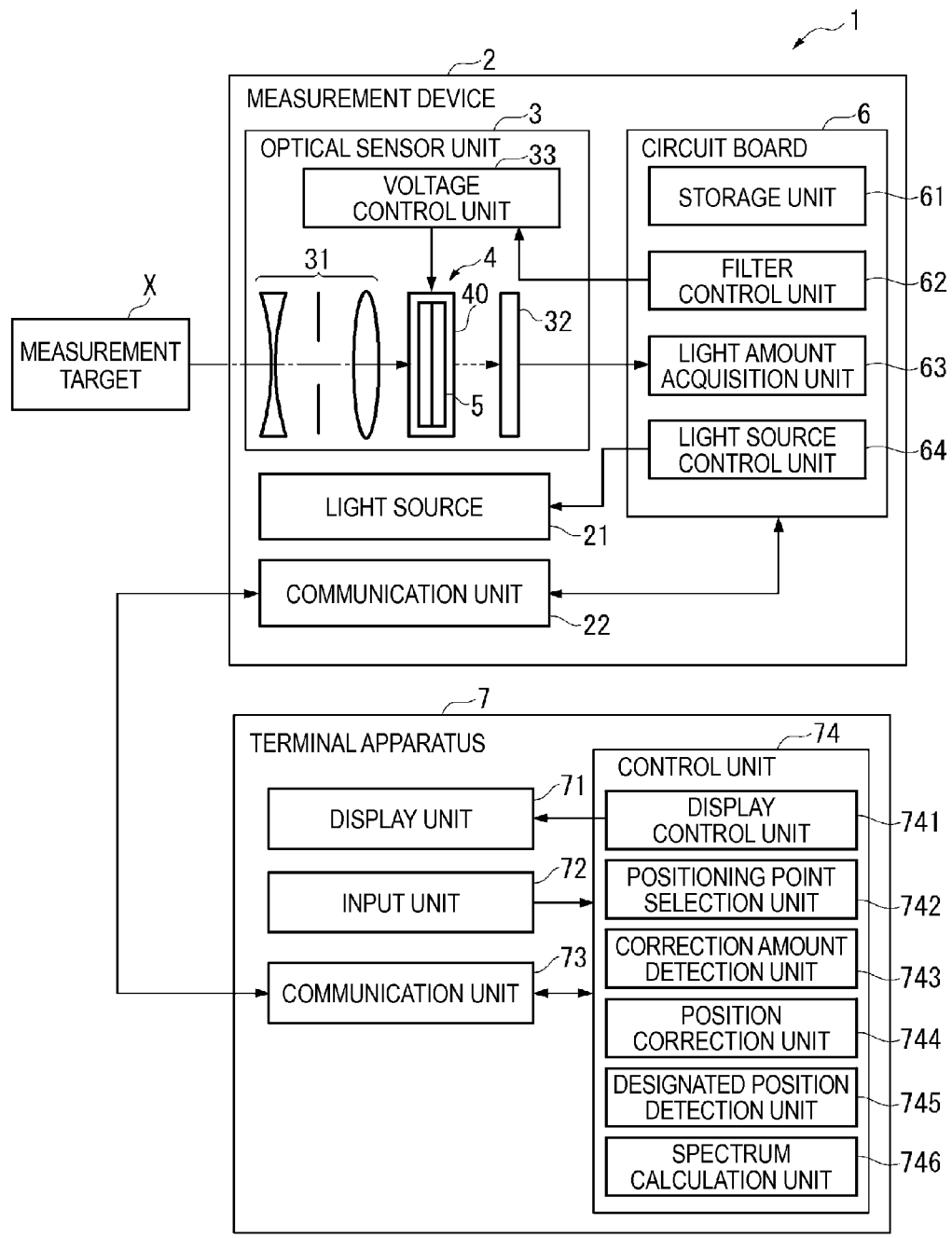
FIG. 1 is a block diagram illustrating the schematic configuration of a color measurement system according to a first embodiment of the invention.

FIG. 1 is a block diagram illustrating the schematic configuration of a color measurement system 1 according to an embodiment of the spectrometer of the invention.

The color measurement system 1 includes a measurement device 2 and a terminal apparatus 7 which can communicate with each other and corresponds to the spectrometer according to the invention.

The color measurement system 1 measures measurement target light (incident light) from a measurement target X and outputs the result of color measurement. For example, the measurement target X may be an image which is printed on a medium, such as a sheet, by a printing apparatus or an image which is displayed on a display, such as a liquid crystal panel. However, the measurement target X is not limited to the image, but may be, for example, a surface of an object.

Configuration of Measurement Device

Figure 2:
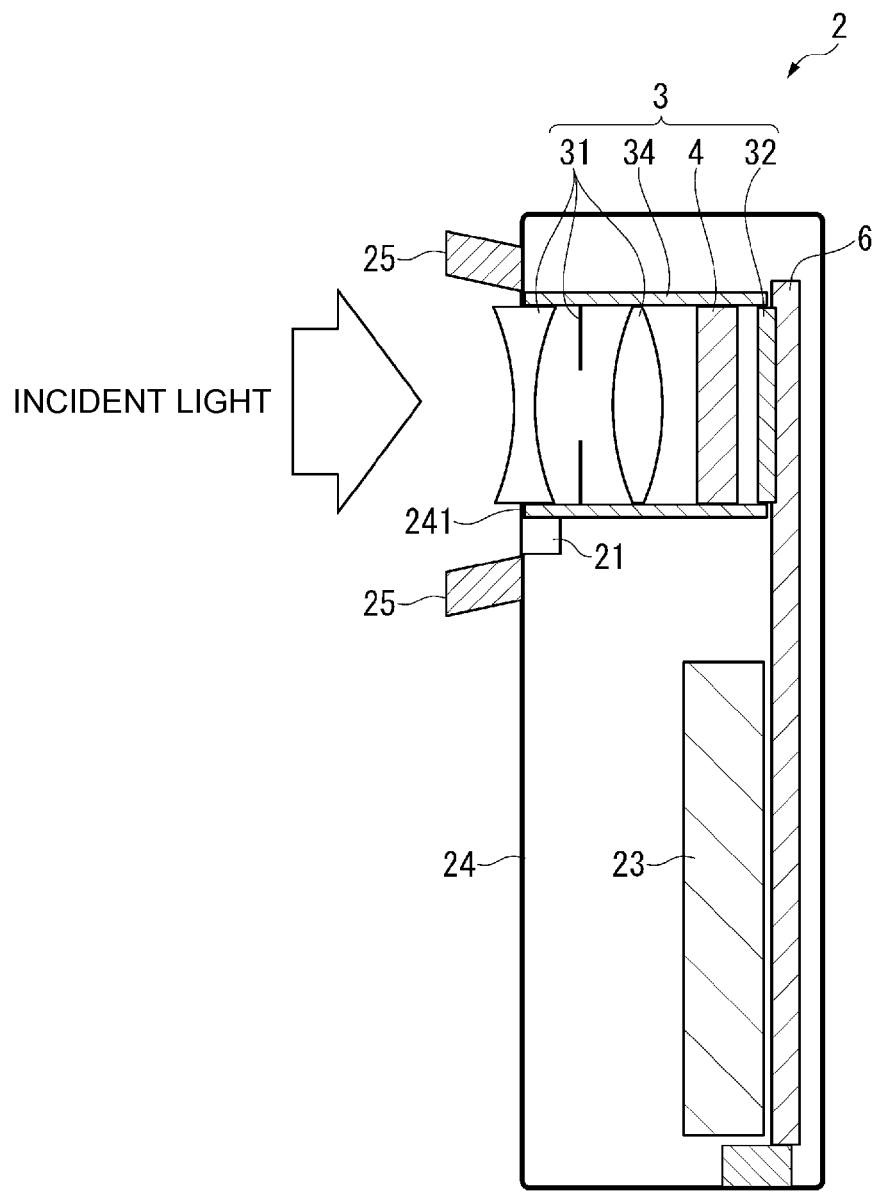
FIG. 2 is a cross-sectional view illustrating the schematic configuration of a measurement device.

FIG. 2 is a diagram illustrating the schematic configuration of the measurement device 2.

As shown in FIGS. 1 and 2, the measurement device 2 includes an optical sensor unit 3 which captures the measurement target light from the measurement target X, a circuit board 6 on which various hardware configurations (for example, an integrated circuit, such as a CPU or a memory) for controlling the measurement device 2 are provided, a light source 21, a communication unit 22, and a battery 23. These members are accommodated in an exterior case 24. The measurement device 2 captures the image of the measurement target X to acquire a spectral image.

A light incident hole 241 through which the measurement target light is incident on the optical sensor unit 3 is provided in the exterior case 24. A cylindrical light shielding portion 25 which protrudes from the exterior case 24 is provided around the light incident hole 241. The light shielding portion 25 is a light shielding member which comes into close contact with the surface of the measurement target X to prevent outside light other than the measurement target light from being incident on the light incident hole 241. The light shielding portion 25 is, for example, a hard member which is not elastically deformed. Therefore, it is easy to fix the measurement device 2 to the measurement target X.

The light source 21 is, for example, an LED which emits white light and purple light and is provided in a region which is disposed around the light incident hole 241 of the exterior case 24 and is surrounded by the light shielding portion 25. The light source 21 emits light to the measurement target X and the measurement device 2 measures light reflected from the measurement target X.

The communication unit 22 communicates with the terminal apparatus 7 or other external apparatuses. The communication unit 22 is configured so as to perform wired communication through, for example, a LAN or various types of wireless communication, such as Wi-Fi (registered trademark), Bluetooth (registered trademark), or infrared communication.

The battery 23 is a power supply which supplies power to the measurement device 2 and is, for example, a secondary battery which can be charged by a charging circuit (not shown). The measurement device 2 is configured so as to be connected to an external apparatus, such as the terminal apparatus 7, and may be supplied with power from the external apparatus.

Configuration of Optical Sensor Unit

The optical sensor unit 3 includes an optical filter device 4 in which a wavelength-variable interference filter 5 is provided in a housing 40, a telecentric optical system which guides the measurement target light to the wavelength-variable interference filter 5, an imaging element which receives light which has passed through the wavelength-variable interference filter 5, and a voltage control unit 33 which changes the wavelength of light passing through the wavelength-variable interference filter 5.

The optical filter device 4, the telecentric optical system 31, and the imaging element 32 are arranged at predetermined positions in an optical component housing 34 with both ends open. The imaging element 32 is arranged at one end of the optical component housing 34 close to the circuit board 6 and an optical component forming the telecentric optical system 31 is arranged at the opposite end. The opposite end is connected to the light incident hole 241 formed in the exterior case 24.

Configuration of Wavelength-Variable Interference Filter

Figure 3:
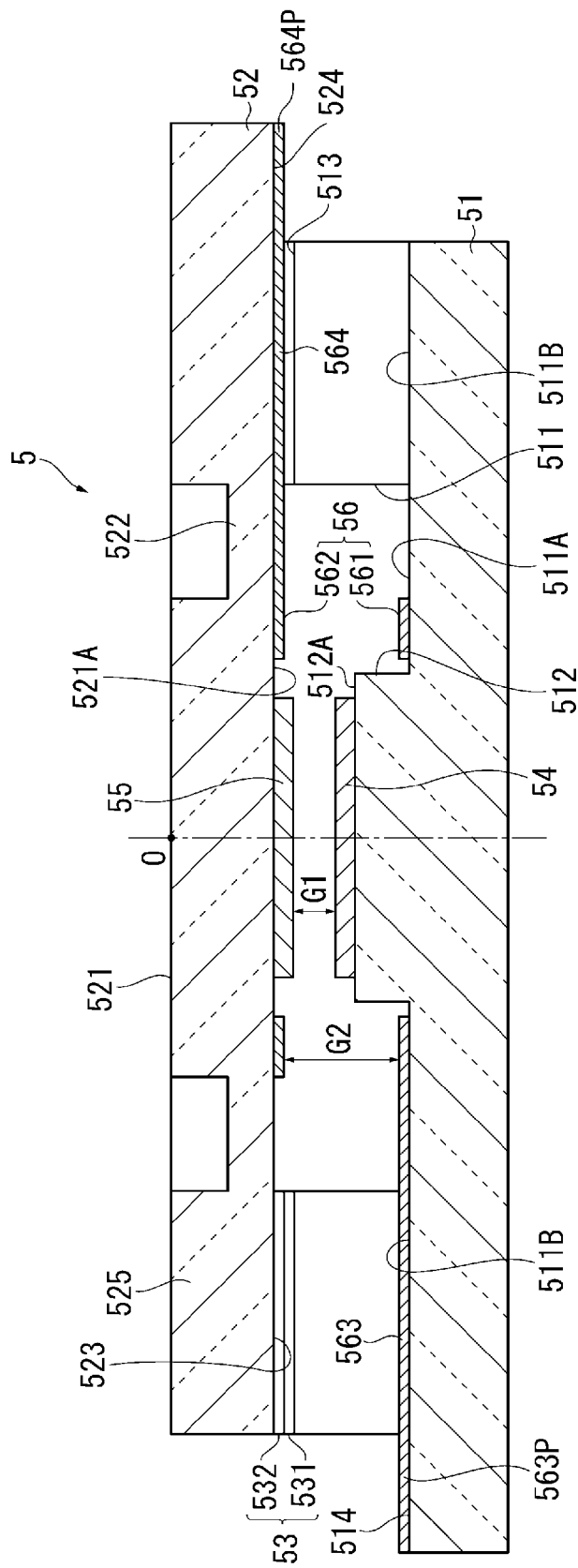
FIG. 3 is a cross-sectional view illustrating the schematic configuration of a wavelength-variable interference filter.

FIG. 3 is a cross-sectional view illustrating the schematic configuration of the wavelength-variable interference filter 5.

The wavelength-variable interference filter 5 is provided in the housing 40. The inside of the housing 40 is a closed space and is maintained in a vacuum environment (or an environment in which pressure is lower than atmospheric pressure). As shown in FIG. 3, the wavelength-variable interference filter 5 includes a fixed substrate 51, which is a first substrate according to the invention, and a movable substrate 52, which is a second substrate according to the invention. The fixed substrate 51 and movable substrate 52 are integrated with each other by bonding a first bonding portion 513 of the fixed substrate 51 and a second bonding portion 523 of the movable substrate with a bonding film 53 (a first bonding film 531 and a second bonding film 532) which is, for example, a plasma-polymerized film having siloxane as a main component.

In the following description, a plan view as viewed from the thickness direction of the fixed substrate 51 or the movable substrate 52, that is, a plan view of the wavelength-variable interference filter 5 as viewed from the laminated direction of the fixed substrate 51, the bonding film 53, and the movable substrate 52 is referred to as a plan view of the filter.

In the plan view of the filter, one side of the fixed substrate 51 protrudes outward from the movable substrate 52. In the protruding portion, a surface which is exposed when the wavelength-variable interference filter 5 is viewed from the movable substrate 52 forms a first electrical surface 514.

In the plan view of the filter, among the sides of the movable substrate 52, one side which faces the first electrical surface 514 protrudes outward from the fixed substrate 51. In the protruding portion, a surface which is exposed when the wavelength-variable interference filter 5 is viewed from the fixed substrate 51 forms a second electrical surface 524.

An electrode arrangement groove 511 and a reflective film arrangement portion 512 are formed in the fixed substrate 51. The thickness of the fixed substrate 51 is more than that of the movable substrate 52 and the fixed substrate 51 is not bent by electrostatic attractive force generated when a voltage is applied between a fixed electrode 561 and a movable electrode 562 or the internal stress of the fixed electrode 561.

The electrode arrangement groove 511 is formed in a ring shape having the central point O of the wavelength-variable interference filter 5 as its center in the plan view of the filter. The reflective film arrangement portion 512 is formed so as to protrude from a central portion of the electrode arrangement groove 511 to the movable substrate 52 in the plan view. The bottom of the electrode arrangement groove 511 is an electrode arrangement surface 511A on which the fixed electrode 561 is arranged. A protruding end surface of the reflective film arrangement portion 512 is a reflective film arrangement surface 512A on which a fixed reflective film 54 is arranged.

An electrode drawing groove 511B which extends from the electrode arrangement groove 511 to the first electrical surface 514 and the second electrical surface 524 is provided in the fixed substrate 51.

The fixed electrode 561 is provided on the electrode arrangement surface 511A of the electrode arrangement groove 511. The fixed electrode 561 is provided in a region of the electrode arrangement surface 511A which faces the movable electrode 562 of a movable portion 521, which will be described below.

A fixed lead electrode 563 which extends from the outer circumference of the fixed electrode 561 to the first electrical surface 514 through the ring-shaped electrode drawing groove 511B is formed on the fixed substrate 51. An extension end portion of the fixed lead electrode 563 forms a fixed electrode pad 563P in the first electrical surface 514.

In this embodiment, one fixed electrode 561 is provided on the electrode arrangement surface 511A. However, for example, two electrodes which are concentric circles having a plane center point O as its center may be provided (double electrode structure).

Among the surfaces of the fixed substrate 51 facing the movable substrate 52, one surface in which the electrode arrangement groove 511, the reflective film arrangement portion 512, and the electrode drawing groove 511B are not formed forms the first bonding portion 513. The first bonding film 531 is provided in the first bonding portion 513. As described above, the first bonding film 531 is bonded to the second bonding film 532 provided on the movable substrate 52 to bond the fixed substrate 51 and the movable substrate 52.

The movable substrate 52 includes a circular movable portion 521 which has the plane central point O as its center in the plan view of the filter, a holding portion 522 which is provided outside the movable portion 521 and holds the movable portion 521, and a substrate outer circumferential portion 525 which is provided outside the holding portion 522.

The thickness of the movable portion 521 is more than that of the holding portion 522. The diameter of the movable portion 521 is more than at least the diameter of the outer circumference of the reflective film arrangement surface 512A in the plan view of the filter. The movable electrode 562 and a movable reflective film 55, which is a second reflective film according to the invention, are provided in the movable portion 521.

The movable electrode 562 faces the fixed electrode 561 with a gap G2 therebetween and has the same ring shape as the fixed electrode 561. The movable substrate 52 includes a movable lead electrode 564 which extends from the outer circumference of the movable electrode 562 to the second electrical surface 524. An extension end portion of the movable lead electrode 564 forms a movable electrode pad 564P in the second electrical surface 524.

The movable reflective film 55 is provided in a central portion of the movable surface 521A of the movable portion 521 so as to face the fixed reflective film 54 with a gap G1 therebetween.

The holding portion 522 is a diaphragm which surrounds the movable portion 521 and has a thickness less than that of the movable portion 521. The holding portion 522 is more likely to be bent than the movable portion 521 and can be bent by low electrostatic attractive force to displace the movable portion 521 to the fixed substrate 51.

As described above, the substrate outer circumferential portion 525 is provided outside the holding portion 522 in the plan view of the filter. One surface of the substrate outer circumferential portion 525 which faces the fixed substrate 51 includes a second bonding portion 523 facing the first bonding portion 513. The second bonding film 532 is provided in the second bonding portion 523. As described above, the second bonding film 532 is bonded to the first bonding film 531 to bond the fixed substrate 51 and the movable substrate 52.

Configuration of Telecentric Optical System, Imaging Element, and Voltage Control Unit The telecentric optical system 31 guides incident light to the wavelength-variable interference filter 5 and includes optical components, such as a plurality of lenses. The telecentric optical system 31 emits the incident light such that a main light beam of the incident light is parallel to the optical axis and is perpendicular to the fixed substrate 51 of the wavelength-variable interference filter 5.

The imaging element 32 is provided on the circuit board 6 so as to be disposed on a focal surface of the telecentric optical system 31. The measurement target light emitted from the measurement target X is guided by the telecentric optical system 31 and is focused on the imaging element 32. The imaging element 32 includes a plurality of detection elements (not shown) which are arranged in an array. The detection element is a photoelectric conversion element, such as a charge coupled device (CCD) or a complementary metal oxide semiconductor (CMOS), generates an electric signal corresponding to the amount of received light, and outputs the electric signal to a light amount acquisition unit 63, which will be described below.

The voltage control unit 33 applies a driving voltage corresponding to the wavelength (measured wavelength) of light transmitted through the wavelength-variable interference filter 5 to the wavelength-variable interference filter 5 under the control of a filter control unit 62, which will be described below.

Configuration of Circuit Board

The circuit board 6 includes various control units for controlling the measurement device 2. Specifically, as shown in FIG. 1, the circuit board 6 includes a storage unit 61, the filter control unit 62, the light amount acquisition unit 63, and a light source control unit 64. The various control units provided on the circuit board 6 are formed by appropriate combinations of an arithmetic circuit, a memory, and various electric circuits.

The storage unit 61 stores various kinds of programs or various kinds of data for controlling the measurement device 2. The data is, for example, V-λ data indicating the wavelength of transmitted light with respect to the driving voltage applied to an electrostatic actuator 56 or information (for example, a measurement start wavelength, a wavelength change interval, and a measurement end wavelength) about the measured wavelength when the measurement target X is measured. In addition, the storage unit 61 stores the amount of received light acquired by the light amount acquisition unit 63 as a spectral image which is associated with the pixel position (coordinate value) of each detection element and the measured wavelength during detection.

The filter control unit 62 acquires the voltage value (input value) of the driving voltage corresponding to the measured wavelength on the basis of the V-λ data stored in the storage unit 61 and outputs the acquired voltage value to the voltage control unit 33 to change the gap of the wavelength-variable interference filter 5.

The filter control unit 62 performs a process of detecting the change time of the measured wavelength, a process of changing the measured wavelength, a process of changing the driving voltage with the change in the measured wavelength, and a process of determining the end of the measurement, on the basis of various kinds of data stored in the storage unit 61, and controls the voltage control unit 33 on the basis of the determination result.

The light amount acquisition unit 63 acquires the amount of transmitted light which has been received by each detection element of the imaging element 32 to acquire the spectral image. The spectral image in which the pixel position is associated with the amount of received light is stored in the storage unit 61 so as to be associated with the measured wavelength during detection. The imaging element 32 and the light amount acquisition unit 63 correspond to an imaging unit according to the invention.

The light source control unit 64 controls the turning on and turning off of the light source 21 in response to instructions from the user.

Configuration of Terminal Apparatus

As shown in FIG. 1, the terminal apparatus 7 includes a display unit 71, an input unit 72, a communication unit 73, and a control unit 74 which controls the terminal apparatus 7.

The display unit 71 is various types of display devices, such as a liquid crystal display or an organic EL display.

The input unit 72 inputs an operation instruction from the user to the control unit 74. Examples of the input unit 72 include various types of touch panels, such as an infrared type, a capacitance type, and an electromagnetic induction type which can detect the operation of the user on the surface of the display unit 71, and various types of input devices, such as a mouse and a keyboard.

The communication unit 73 communicates with the measurement device 2 or other external apparatuses. The communication unit 73 is configured so as to perform wired communication through, for example, a LAN or various types of wireless communication, such as Wi-Fi, Bluetooth, or infrared communication.

The control unit 74 includes various control units for controlling the terminal apparatus 7 and the color measurement system 1, specifically, a display control unit 741, a positioning point selection unit 742, a correction amount detection unit 743, a position correction unit 744, a designated position detection unit 745, and a spectrum calculation unit 746, as shown in FIG. 1. The various control units included in the control unit 74 are formed by appropriate combinations of, for example, an arithmetic circuit, a memory, and various electric circuits.

The display control unit 741 controls the display content of the display unit 71. An example of the display content is a reference image which is a composite image of the spectral images captured by the measurement device 2. In addition, examples of the display content include an operation screen for operating the color measurement system 1 and a notification image for notifying the user of the operation conditions, measurement result and the like of the measurement device 2.

The positioning point selection unit 742 selects a standard positioning point when a plurality of spectral images acquired by the measurement device 2 are positioned, on the basis of the received light intensity of each pixel in the spectral images. In this embodiment, it is assumed that one of adjacent pixels having the largest difference in received light intensity therebetween is used as the positioning point. A positioning point selection method of the positioning point selection unit 742 will be described in detail below.

The correction amount detection unit 743 forms a positional deviation amount measurement unit according to the invention and detects the correction amount of each spectral image when positioning is performed, on the basis of the positioning point selected by the positioning point selection unit 742. In this embodiment, the correction amount detection unit 743 detects a correction amount for correction such that the positioning points between the spectral images having the measured wavelengths which are closest to each other are aligned with each other in the spectral images with a plurality of measured wavelengths. The detection of the correction amount by the correction amount detection unit 743 will be described in detail below.

The position correction unit 744 corrects the pixel position of each spectral image on the basis of the correction amount detected by the correction amount detection unit 743.

The designated position detection unit 745 specifies a measurement target position (designated position) which is designated by the operation of the input unit 72 by the user. Specifically, when an operation signal for selecting a desired color measurement point, that is, a designated position from a reference image indicating the measurement target X displayed on the display unit 71, is input, the designated position detection unit 745 acquires an image position at the designated position.

In this embodiment, the designated position may be a region of a predetermined range including the coordinate value of the designated pixel. In this case, a region of a predetermined pixel range having the coordinate value as its center may be the designated position. In addition, the image may be divided into a plurality of regions in advance and a region including the coordinate value of the designated pixel may be used as the designated position.

The spectrum calculation unit 746 acquires the light value of each pixel at the designated position from the spectral images corresponding to a plurality of measurement target wavelengths acquired by the measurement device 2 and calculates an average light value which is the average value of the light values. The spectrum calculation unit 746 associates the average light value of the designated position at each measurement target wavelength with the measured wavelength to generate a color measurement result and stores the color measurement result in a storage unit (not shown).

Configuration of Color Measurement System
Acquisition of Spectral Image

Figure 4:
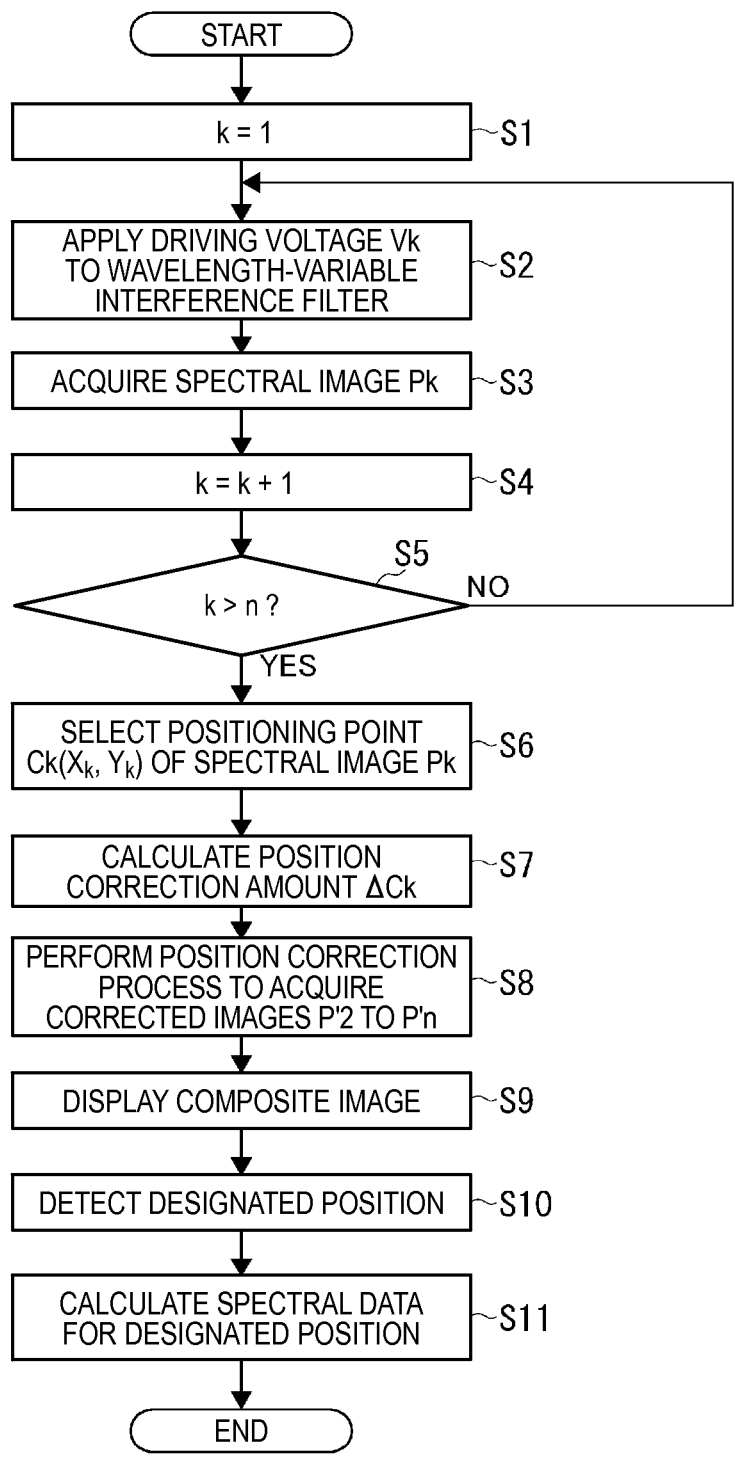
FIG. 4 is a flowchart illustrating a process of the color measurement system.

FIG. 4 is a flowchart illustrating the operation of the color measurement system 1.

As shown in FIG. 4, when the color measurement system 1 performs a spectrum measurement process, first, the filter control unit 62 initializes a set variable k (k=1) (Step S1).

Then, the filter control unit 62 reads a driving voltage Vk corresponding to a measured wavelength λk (1≤k≤n) with reference to the V-λ data stored in the storage unit 61. Then, the filter control unit 62 controls the voltage control unit 33 such that the read driving voltage Vk is applied to the electrostatic actuator 56 of the wavelength-variable interference filter 5 (Step S2). In the following description, it is assumed that the measured wavelength λk satisfies the relationship λ1>λ2> ... λi>λi+1> ... λn−1>Xn, and λi+1−λi is, for example, 10 nm.

In this embodiment, for example, the measured wavelength λk which is arranged at an interval of 10 nm is sequentially acquired. However, the measured wavelength which is set in advance or is appropriately set by the user may be used. In this case, it is preferable that the measured wavelength satisfy the relationship λ1>xλ2> ... λi>λi+1> ... λn−1>Xn.

When the driving voltage is applied to the electrostatic actuator 56 in Step S1, the gap G1 between the reflective films 54 and 55 is changed to a value corresponding to the driving voltage. Then, light with the measured wavelength λ1 passes through the wavelength-variable interference filter 5 and is then detected by the imaging element 32. The light amount acquisition unit 63 acquires a spectral image Pk for measurement for a region Ar1 which can be captured and stores the spectral image Pk in the storage unit 61 so as to be associated with the amount of received light, the pixel position, and the measured wavelength (Step S3). In this embodiment, the acquired spectral image Pk is stored in the storage unit 61. However, the acquired spectral image Pk may be sequentially transmitted to the terminal apparatus 7 and then stored in a storage unit (not shown), such as a memory, which is provided in the terminal apparatus 7.

When the spectral image Pk is acquired in Step S3, the filter control unit 62 adds 1 to the variable k (k=k+1) (Step S4).

Then, the filter control unit 62 determines whether k>n is satisfied (Step S5). That is, the filter control unit 62 determines whether spectral images P1 to Pn for all of predetermined measured wavelengths λ1 to λn are acquired.

When it is determined in Step S5 that k≤n is satisfied and measurement for all of the measured wavelengths has not been completed (when the determination result is "No"), the process returns to Step S2.

In contrast, when it is determined in Step S5 that k>n is satisfied and measurement for all of the measured wavelengths has been completed (when the determination result is "Yes"), the terminal apparatus 7 performs a process of positioning each of the acquired spectral images Pk.

Selection of Positioning Point

Figures 5A, 5B:
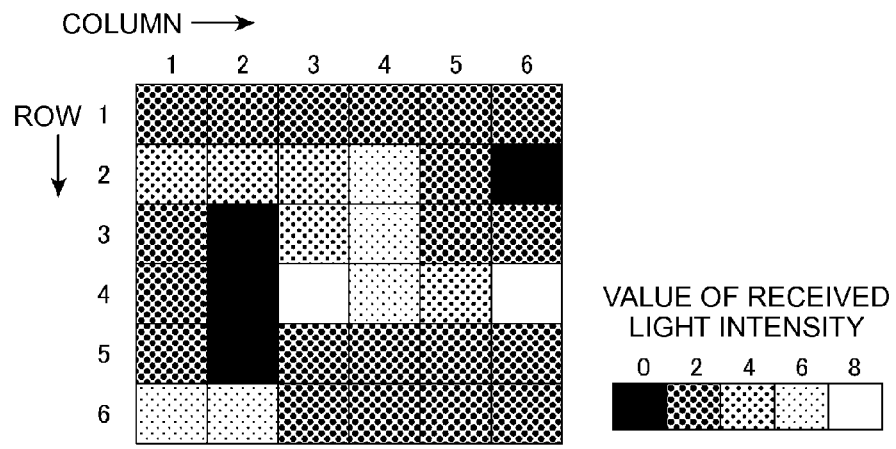
FIGS. 5A and 5B are diagrams illustrating the relationship between received light intensity and a positioning point.
Figure 6A:
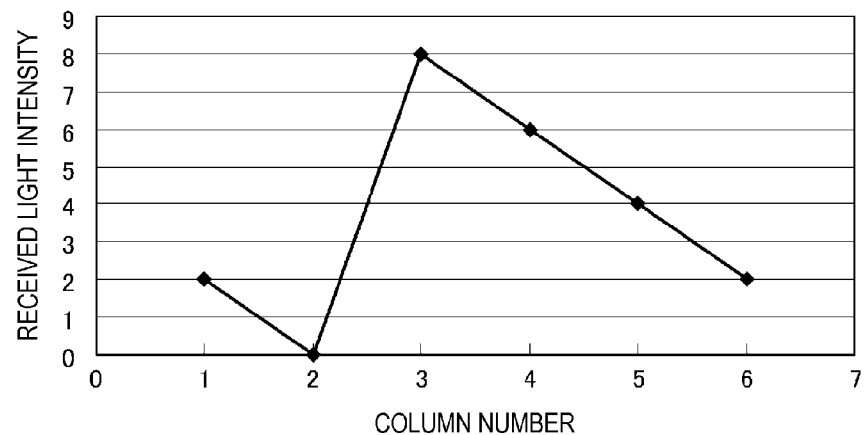
FIGS. 6A and 6B are graphs illustrating the relationship between the received light intensity and the positioning point.
Figure 6B:
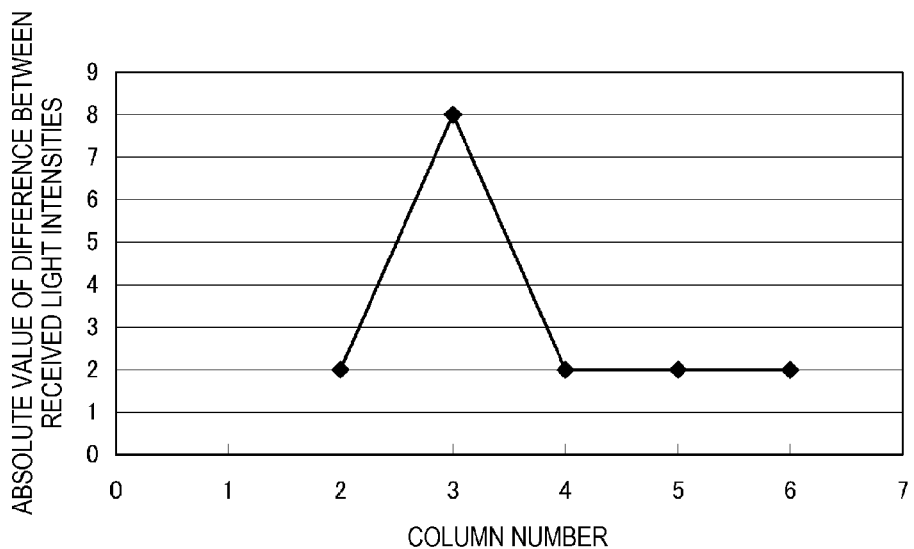

FIG. 5A is a diagram schematically illustrating received light intensity in a region of a given spectral image Pk which is captured by the measurement device 2. FIG. 5B is a diagram illustrating the received light intensity of each pixel with row number 4, a difference in received light intensity, and the absolute value of the difference in received light intensity. FIG. 6A is a graph illustrating the received light intensity shown in FIG. 5B. FIG. 6B is a graph illustrating the absolute value of the difference in received light intensity between adjacent pixels shown in FIG. 5B. In FIG. 5A, for example, the value of the received light intensity of 6×6 (36) pixels is shown in five levels of 0, 2, 4, 6, and 8.

In the positioning process, for example, the positioning point selection unit 742 selects, as the positioning point, a pixel with the largest difference in received light intensity between adjacent pixels in each row direction (Step S6).

In this embodiment, for example, as shown in FIG. 5B, when the received light intensity of each pixel (x, y) is S(x, y), a received light intensity difference T(x, y1) between pixels (x, y1) (where 1≤x≤m$_{max}$) with row number y1 is S(x, y1)−S(x−1, y1).

Then, the positioning point selection unit 742 selects a pixel with the largest absolute value of the difference in received light intensity in each row direction. For example, a pixel (3, 4) with row number 4 and column number 3 is selected. In addition, similarly, the positioning point selection unit 742 selects a pixel with the largest difference in received light intensity in each row and uses the pixel with the highest received light intensity among the selected pixels as the positioning point Ck.

In this way, positioning points C1 to Cn in spectral images P1 to Pn are selected.

When there are a plurality of pixels with the largest difference in received light intensity in each row, a pixel with the highest received light intensity may be used as the positioning point or a pixel with the lowest received light intensity may be used as the positioning point.

In this embodiment, the positioning point Ck is detected by scanning in the row direction. However, the positioning point Ck may be detected by scanning in the column direction. In addition, the positioning point Ck may be detected by scanning in both the row direction and the column direction. For example, among a plurality of pixels with the largest difference in received light intensity in the row direction, a pixel with the largest difference in received light intensity in the column direction is detected as the positioning point Ck. In this way, it is possible to detect a feature point. The feature point corresponds to a predetermined position of a measurement target according to the invention.

Positioning Process

Then, returning to FIG. 4, the correction amount detection unit 743 calculates the position correction amount ΔCk (k=2 to n) of each spectral image Pk (k=2 to n) (Step S7).

Figure 7A:
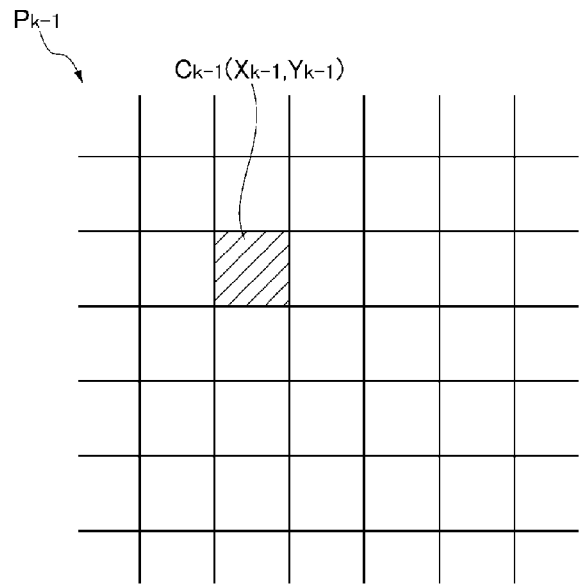
FIGS. 7A and 7B are diagrams illustrating positional deviation between spectral images.
Figure 7B:
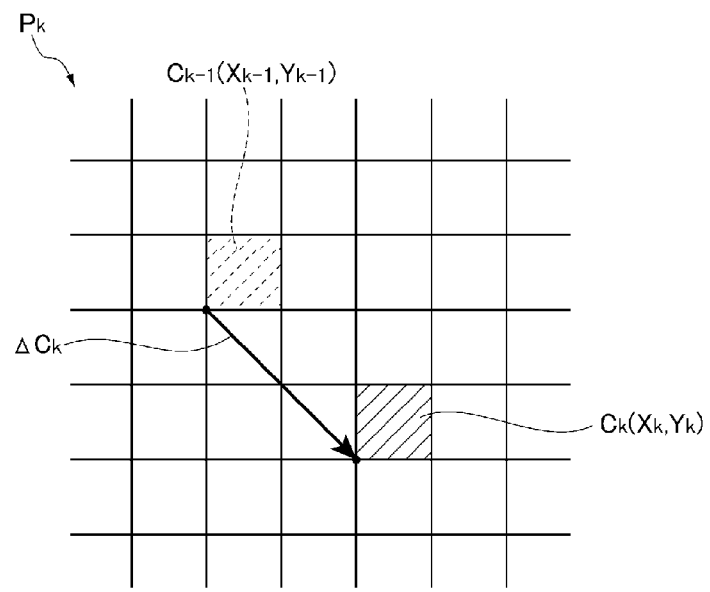

FIG. 7A is a diagram illustrating a positioning point Ck−1 (X$_{k-1}$, Y$_{k-1}$) in the spectral image Pk−1 and FIG. 7B is a diagram illustrating a positioning point Ck(X$_k$, Y$_k$) in the spectral image Pk. In FIGS. 7A and 7B, one lattice indicates one pixel. Basically, the positioning points Ck and Ck−1 shown in FIGS. 7A and 7B are pixels which receive the measurement target light from the same point of the measurement target X (a predetermined position of the measurement target).

As shown in FIGS. 7A and 7B, when a relative positional deviation between the measurement device 2 and the measurement target X occurs due to, for example, hand shaking for the period from the acquisition of the spectral image Pk−1 to the acquisition of the spectral image Pk, the positional deviation between the positioning points Ck and Ck−1 occurs as shown in FIG. 7B. The correction amount detection unit 743 detects a positional deviation amount between the positioning points Ck and Ck−1 as the position correction amount ΔCk for the spectral image Pk.

Specifically, the correction amount detection unit 743 calculates the position correction amount ΔCk for the spectral image Pk using the following Expression (1).

$$\Delta C_k = (X_k - X_{k-1}, Y_k - Y_{k-1}) \tag{1}$$

Then, the position correction unit 744 corrects the position of the spectral image Pk (k=2 to n) on the basis of the spectral image Pk−1, using the position correction amount ΔCk calculated by the correction amount detection unit 743, to acquire a corrected image P'k (k=2 to n) and stores the corrected image P'k in a storage unit such as a memory (Step S8).

Detection of Designated Position

Then, the display control unit 741 generates a reference image using the spectral image P1 and the corrected image P'k and displays the reference image on the display unit 71 (Step S9).

Specifically, the display control unit 741 generates a three-band reference image using predetermined wavelengths which are set in advance in R (for example, 610 nm to 760 nm), G (for example, 500 nm to 560 nm), and B (for example, 435 nm to 480 nm) wavelength regions, that is, the corrected images P'k which correspond to three predetermined wavelengths (three bands) corresponding to R, G, and B colors, and displays the three-band reference image on the display unit 71.

In this embodiment, the reference image obtained by composing three corrected images is displayed. However, the invention is not limited thereto. For example, four or more images among the spectral images P1 and the corrected images P'k (k=2 to n) may be composed.

Figure 8:
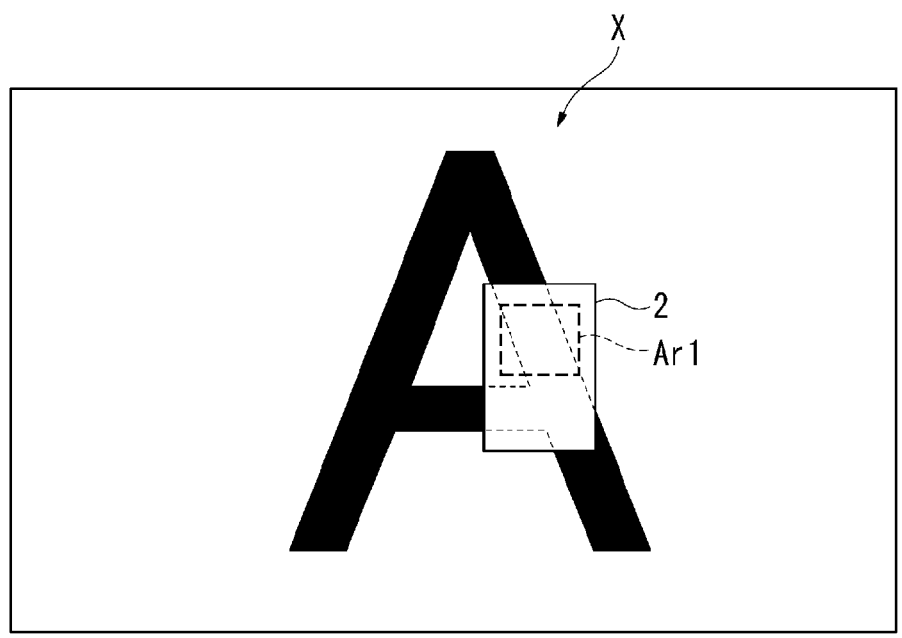
FIG. 8 is a diagram schematically illustrating a designated position selection operation.
Figure 8:
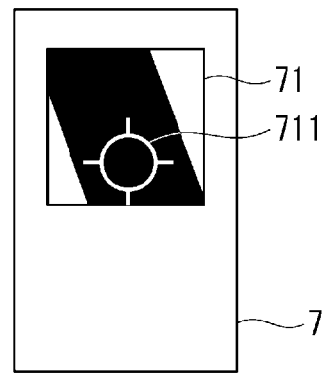

FIG. 8 is a diagram illustrating an example of the measurement device 2 which is arranged relative to the measurement target X and the reference image displayed on the display unit 71 of the terminal apparatus 7.

As shown in FIG. 8, during measurement, the measurement device 2 is arranged on the surface of the measurement target X. Then, the measurement device 2 captures an image which is included in an imaging region Ar1 (a region represented by a dotted line in FIG. 8) of the imaging element 32 of the optical sensor unit 3 and acquires the spectral images P1 to Pn. As described above, the terminal apparatus 7 generates the reference image on the basis of the acquired spectral images P1 to Pn and enlarges and displays the image of the region Ar1 which can be captured on the display unit 71.

The user performs a predetermined operation for designating a spectrum acquisition position (designated position) while referring to the displayed reference image. The predetermined operation may be any operation which can be detected as an instruction for the designated position by the input unit 72.

The designated position detection unit 745 detects, as the designated position, a region (color measurement region Ar2) with a predetermined size which includes the operation position designated by the operation of the input unit 72 (Step S10).

Figure 9:
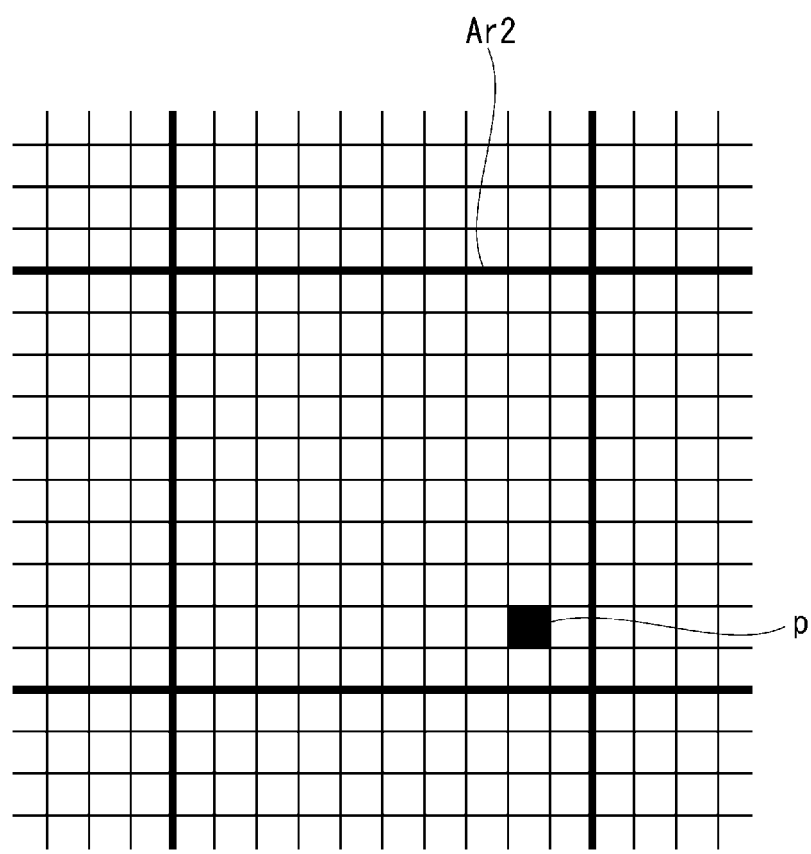
FIG. 9 is a diagram schematically illustrating a color measurement region in the embodiment.

FIG. 9 schematically shows an example of the designated position according to this embodiment. As shown in FIG. 9, the captured spectral image is divided into, for example, pixel regions, each of which has 10×10 pixels, in advance and the designated position detection unit 745 detects, as a color measurement region Ar2, a pixel region including a pixel p which corresponds to the operation position designated by an input operation.

When the user specifies the designated position (color measurement region Ar2), a cursor 711 indicating the designated position may be displayed on the display unit 71, as shown in FIG. 8.

Calculation of Color Measurement Result

Returning to FIG. 4, the spectrum calculation unit 746 calculates spectral data for the position corresponding to the detected designated position (Step S11).

Specifically, the spectrum calculation unit 746 detects pixels included in the designated positions (color measurement regions Ar2) in the spectral image P1 and each corrected image P'k (k=2 to n) and calculates the average light value at the designated position from the light values of the detected pixels. Then, the spectrum calculation unit 746 stores spectral data in which the calculated average light value is associated with the corresponding measured wavelength as the color measurement result in a storage unit (not shown), such as a memory, in the control unit 74.

The terminal apparatus 7 may display the calculated spectral data on, for example, the display unit 71 or may output the calculated spectral data to an external apparatus, such as a printing apparatus or an image display device, if necessary.

Operation and Effect of First Embodiment

The color measurement system 1 detects the positional deviation between the pixels of the spectral images and corrects the positions of the spectral images to align the positions. At that time, the color measurement system 1 selects the positioning points C1 to Cn, which are comparative points used for positioning, on the basis of the received light intensity of the spectral images P1 to Pn. Then, the color measurement system 1 detects the positional deviation amount between the corresponding positioning points of the spectral images P1 to Pn and performs positioning on the basis of the positional deviation amount. Therefore, even when the positional deviation from the measurement target occurs during measurement, it is possible to prevent the influence of the positional deviation by positioning the spectral images.

Since the positioning points are selected on the basis of the received light intensity of the spectral images, it is not necessary to provide a member, such as a sensor for detecting the positional deviation amount, and to separately measure the positional deviation amount. Therefore, it is possible to rapidly perform positioning with a simple configuration.

The color measurement system 1 extracts the pixels with the largest difference in received light intensity between adjacent pixels in each row direction and uses the pixel with the highest received light intensity among the extracted pixels as the positioning point. As such, the pixel with the largest difference in received light intensity (the pixel with a high rate of change in received light intensity) in the spectral image is likely to be an edge portion of the image and is likely to be disposed at the same position in each spectral image. Therefore, the use of the pixel positioning point makes it possible to perform positioning between the spectral images with high accuracy.

The color measurement system 1 performs positioning between the spectral images with the measured wavelengths which are closest to each other.

The spectral images with a close wavelength spacing therebetween are likely to have a common portion with high received light intensity and to have substantially the same received light intensity distribution (light amount distribution). Therefore, it is easy to detect a common positioning point between the spectral images and it is possible to improve the accuracy of positioning.

In particular, the positioning points are likely to be identical to each other between the spectral images with the closest wavelength spacing therebetween and it is possible to further improve the accuracy of positioning.

As described above, the color measurement system 1 can perform positioning with high accuracy. Therefore, the color measurement system 1 can provide high-accuracy spectral data.

The color measurement system 1 disperses the measurement target light using the wavelength-variable Fabry-Perot etalon. Therefore, it is possible to extract light with a plurality of wavelengths in a short time by changing the gap and thus to reduce the measurement time. In addition, it is possible to reduce the size of the Fabry-Perot etalon, as compared to when, for example, AOTF or LCTF is used, and thus to reduce the size of the spectrometer.

In the color measurement system 1, the designated position is the color measurement region Ar2 including a plurality of pixels and the color measurement result is output, using the average light value of the designated region as the light value of the designated position.

Therefore, it is possible to average color variations between the dots (pixels) of the measurement target X in the color measurement region Ar2 or variations in light receiving sensitivity between the pixels of the imaging element 32 and thus to improve the S/N ratio.

In the above-described embodiment, the process of correcting the position of the spectral image Pk (k=2 to n) on the basis of the position correction amount ΔCk, using the spectral image Pk−1 as the standard image, is performed as the positioning process. However, the positioning process is not limited thereto.

For example, a process of correcting the position of the spectral image Pk (k=2 to n), using the spectral image P1 as the standard image, may be performed to acquire the corrected image P'k (k=2 to n). In this case, the coordinates of each pixel of the corrected image P'k (k=2 to n) are calculated by the following Expression (2).

$$\text{(the coordinates of each pixel in the corrected image } P'k) = \text{(the coordinates of each pixel in the spectral image } Pk) - \sum_{l=2}^{k} \Delta Cl \qquad (2)$$

Second Embodiment

Next, a second embodiment of the invention will be described.

In the first embodiment, when the common positioning point between the spectral images is detected, the configuration and method which can appropriately position the spectral images have been described. However, in some cases, since the spectral images have different received light intensity distributions (light amount distributions), it is difficult to detect the common positioning point. In contrast, the second embodiment differs from the first embodiment in that, when it is difficult to detect the common positioning point in the spectral images, an appropriate positioning point is set.

In this embodiment, in Step S6, the positioning point is selected by the following process.

That is, a positioning point selection unit 742 determines whether a positioning point Ck detected from a spectral image Pk is a pixel in a predetermined pixel region (for example, a rectangular region of $(x_{k-1}-50, y_{k-1}-50) \times (x_{k-1}+50, y_{k-1}+50)$) which has the pixel position $(x_{k-1}, y_{k-1})$ of a positioning point Ck−1 selected from a spectral image Pk−1 as its center.

When the detected positioning point Ck is in the pixel region having the positioning point Ck−1 of the detected spectral image Pk−1 as its center, the positioning points Ck−1 and Ck are selected in the positioning between the spectral image Pk−1 and the spectral image Pk (similarly to in the first embodiment).

When the detected positioning point Ck is not in the pixel region having the positioning point Ck−1 of the spectral image Pk−1 as its center, the positioning point selection unit 742 selects a pixel region (for example, a rectangular region of $(x_k-50, y_k-50) \times (x_k+50, y_k+50)$) having the pixel position $(x_k, y_k)$ of the positioning point Ck as its center in the spectral image Pk−1 and extracts a second positioning point C'k−1 from this region. For example, the same method as that in the first embodiment can be used as a method of selecting the second positioning point C'k−1. Pixels with the largest difference in received light intensity in each row are extracted and a pixel with the highest received light intensity among the extracted pixels is selected.

In this embodiment, another example of the process in Step S6 is the following process.

A predetermined pixel region (for example, a rectangular region of $(x_{k-1}-50, y_{k-1}-50) \times (x_{k-1}+50, y_{k-1}+50)$) having, as its center, the pixel position $(x_{k-1}, y_{k-1})$ of the positioning point Ck−1 selected from the spectral image Pk−1 is selected from the spectral image Pk and the positioning point Ck is extracted from the region. When it is difficult to extract the positioning point Ck, the positioning point Ck is extracted in an arbitrary region of the spectral image Pk, a predetermined pixel region having the positioning point Ck as its center is selected from the spectral image Pk−1, and the second positioning point C'k−1 is selected in this region.

Operation and Effect of Second Embodiment

The color measurement system according to the second embodiment determines whether a common positioning point can be detected from the spectral image in the order of acquisition. When it is difficult to detect the common positioning point, the positioning point of the previously acquired spectral image is set on the basis of the positioning point of the next acquired spectral image among the spectral images to be determined.

Therefore, the same point in all sections of the measurement target wavelength does not need to be used as the positioning point and it is possible to reliably perform positioning with high efficiency.

Third Embodiment

Next, a third embodiment of the invention will be described.

In the first embodiment, one positioning point is selected from one spectral image. In contrast, the third embodiment differs from the first embodiment in that a plurality of positioning points are selected from one spectral image.

In this embodiment, in Step S6 which selects positioning points, for example, pixels with the largest difference in received light intensity which are extracted from each row are selected as positioning points Ckj (j is a positioning point identifier and corresponds to, for example, a row number).

When a plurality of pixels with the largest difference in received light intensity are extracted from each row, all pixels corresponding to the plurality of pixels may be selected as the positioning points Ckj (j is a positioning point identifier and indicates, for example, a j-th positioning point of a spectral image Pk). In addition, a pixel with a difference in received light intensity equal to or greater than a predetermined threshold value may be selected as the positioning point Ckj.

In this case, it is determined whether each positioning point Ckj of the spectral image Pk corresponds to a positioning point C(k−1)j which is detected from a spectral image Pk−1. For example, it is determined whether the positioning point C(k−1)j is in a predetermined pixel region (for example, 100×100 dpi) having the positioning point Ckj as its center in the spectral image Pk−1.

When there is no corresponding positioning point C(k−1)j, positioning is not performed for the positioning point Ckj. As in the second embodiment, the positioning point C(k−1)j for the positioning point Ckj may be separately searched for.

In Step S7, the correction amount detection unit 743 sets the coordinates of each positioning point Ckj as $(X_{kj}, Y_{kj})$, sets the coordinates of each positioning point C(k−1)j as $(X_{(k-1)j}, Y_{(k-1)j})$, and calculates a partial position correction amount $\Delta Ckj$ using the following Expression (3).

$$\Delta Ckj = (X_{kj} - X_{(k-1)j}, Y_{kj} - Y_{(k-1)j}) \quad (3)$$

That is, in this embodiment, the partial position correction amount $\Delta Ckj$ is calculated so as to correspond to the number of positioning points corresponding to the spectral images Pk and Pk−1.

Then, when the spectral image Pk is positioned relative to the spectral image Pk−1, the correction amount detection unit 743 calculates the entire correction amount $\Delta Ck$ for the spectral image Pk such that the sum of the distances between the positioning points Ckj and C(k−1)j after positioning is the minimum.

For example, the correction amount detection unit 743 uses the average of the partial position correction amounts $\Delta Ckj$ as the entire correction amount $\Delta Ck$, as shown in the following Expression (4).

$$\Delta Ck = \Sigma \Delta Ckj/j \quad (4)$$

Operation and Effect of Third Embodiment

In this embodiment, a plurality of positioning points are selected from one spectral image and positioning between the spectral images is performed. Therefore, even when positional deviation occurs in the plane parallel to the measurement target X due to rotation in the measurement device 2, it is possible to perform positioning corresponding to the positional deviation. Therefore, the accuracy of positioning is improved.

In this embodiment, positioning is performed such that the sum of the distances between a plurality of corresponding positioning points after positioning is the minimum.

In general, when a change in the positional relationship between the measurement target X and the measurement device 2 is a combination of various changes, such as an inclination change and a distance change, not all positioning points are aligned with each other only by two-dimensional movement (parallel movement or rotational movement).

Therefore, when positioning is performed between the spectral images such that the sum of the distances between a plurality of corresponding positioning points after positioning is the minimum, it is possible to optimally correct the positional deviation with high efficiency, using only the positioning process using parallel movement and rotational movement.

In this embodiment in which positioning is performed using a plurality of positioning points, when there is no corresponding positioning point, positioning may be performed using only non-corresponding positioning points. As described in the second embodiment, the corresponding positioning point may be set again.

Fourth Embodiment

Next, a fourth embodiment of the invention will be described with reference to the drawings.

In the first embodiment, the color measurement system 1 captures the image of the measurement target X, acquires the spectral images P1 to Pn, and detects the color measurement position on the basis of instructions.

In contrast, in the fourth embodiment, a color measurement system displays a real-time image (reference image) obtained by composing three-band (three-wavelength) spectral images captured by a measurement device 2 on a display unit 71 of a terminal apparatus 7. When the user specifies a designated position while referring to the real-time image displayed on the display unit 71 of the terminal apparatus 7, the terminal apparatus 7 detects the designated position. When the designated position is detected, the color measurement system performs color measurement.

The color measurement system according to the fourth embodiment basically has the same configuration as the color measurement system 1 according to the first embodiment except that it detects a color measurement position on the basis of the designated position specified from the real-time image displayed on the display unit 71 and acquires the spectral images P1 to Pn.

Operation of Color Measurement System

Figure 10:
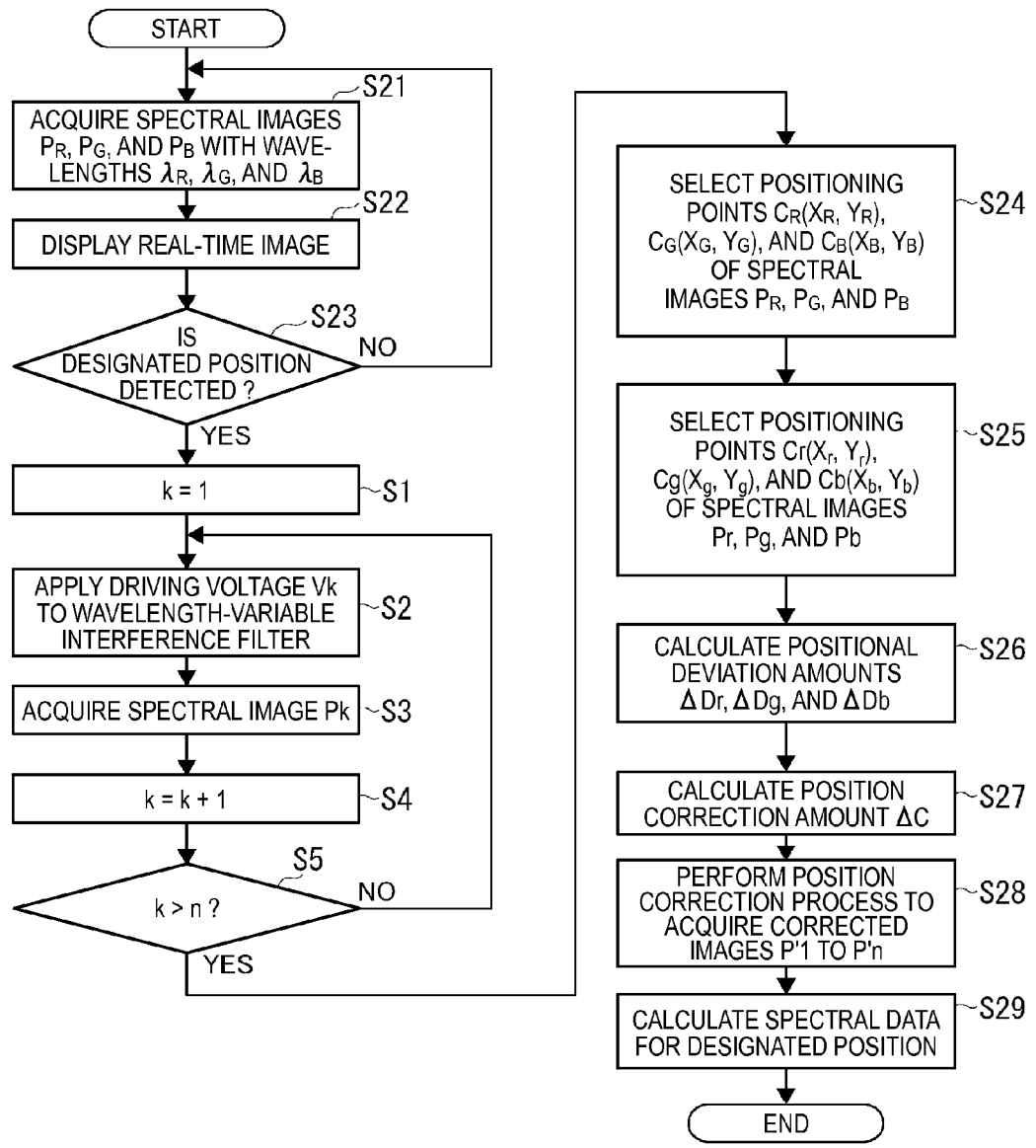
FIG. 10 is a flowchart illustrating a process of a color measurement system according to a second embodiment of the invention.

FIG. 10 is a flowchart illustrating the operation of the color measurement system.

As shown in FIG. 10, in the color measurement system according to this embodiment, first, when an instruction to acquire a real-time image is received from the user through an input unit 72, spectral images $P_R$, $P_G$, and $P_B$ (spectral images for generating a reference image) with three predetermined wavelengths $\lambda_R$, $\lambda_G$, and $\lambda_B$ (three bands) corresponding to R (red wavelength band), G (green wavelength band), and B (blue wavelength band) colors are acquired (Step S21). Then, a filter control unit 62 controls a voltage control unit 33 such that driving voltages $V_R$, $V_G$, and $V_B$ corresponding to the three predetermined wavelengths are sequentially applied to an electrostatic actuator 56. Then, light components with three predetermined wavelengths sequentially pass through a wavelength-variable interference filter 5 and are then detected (captured) by an imaging element 32. In this way, the spectral images $P_R$, $P_G$, and $P_B$ corresponding to the wavelengths are sequentially acquired.

The measurement device 2 sequentially transmits the acquired spectral images $P_R$, $P_G$, and $P_B$ to the terminal apparatus 7. When the terminal apparatus 7 receives the spectral images $P_R$, $P_G$, and $P_B$, a display control unit 741 enlarges and displays a reference image, which is a composite image of the spectral images $P_R$, $P_G$, and $P_B$, as the real-time image on the display unit 71 (Step S22).

The user performs a predetermined operation to specify a designated position while referring to the displayed real-time image. A designated position detection unit 745 detects the designated position, that is, a color measurement region Ar2 in response to the input of an operation (Step S23). The detection of the designated position by the designated position detection unit 745 is the same as that in the first embodiment.

When the user designates the color measurement position, the color measurement system continuously performs the process of acquiring the real-time image and displaying the real-time image until the designated position detection unit 745 detects the designated position (Steps S21 to S23).

When the designated position is detected in Step S23, the terminal apparatus 7 instructs the measurement device 2 to start a color measurement process. When receiving an instruction to start the color measurement process from the terminal apparatus 7, the measurement device 2 performs the same measurement spectral image acquisition process as that in the color measurement system 1 according to the first embodiment (Steps S1 to S5). Then, when it is determined in Step S5 that the spectral images Pk corresponding to all measured wavelengths have been acquired, positioning is performed using the spectral image for generating a reference image as the standard image.

Specifically, the positioning point selection unit 742 selects the positioning points $C_R(X_R, Y_R)$, $C_G(X_G, Y_R)$, and $C_B(X_B, Y_B)$ of the spectral images $P_R$, $P_G$, and $P_B$ which have been used to obtain the real-time image displayed at the time when the designated position is detected in Step S23 (Step S24).

The positioning point selection unit 742 selects the positioning points $Cr(X_r, Y_r)$, $Cg(X_g, Y_g)$, and $Cb(X_b, Y_b)$ of spectral images Pr, Pg, and Pb with wavelengths λr, λg, and λb which are respectively equal or closest to the wavelengths $\lambda_R$, $\lambda_G$, and $\lambda_B$ from all measured wavelengths λ1 to λn (Step S25). The spectral images Pr, Pg, and Pb are an example of a representative image according to the invention.

In this embodiment, the positioning points $C_R(X_R, Y_R)$, $C_G(X_G, Y_G)$, $C_B(X_B, Y_B)$, $Cr(X_r, Y_r)$, $Cg(X_g, Y_g)$, and $Cb(X_b, Y_b)$ are detected from an inspection region (for example, a region of 100 pixels×100 pixels) having, as its center, a pixel p corresponding to the operation position designated by the user shown in FIG. 8 which has the designated position detected in Step S23 as its center. The detection region is not limited to the inspection region, but may be, for example, the color measurement region Ar2.

The positioning points can be selected (detected) by the same method as that in the first to third embodiments. For example, pixels with the largest difference in received light intensity in each row direction of the inspection region are selected, pixels with the highest received light intensity among the selected pixels are extracted, and a pixel with the highest received light intensity among the pixels which are extracted from each row is used as the positioning point.

Then, the correction amount detection unit 743 calculates a position correction amount ΔC common to the spectral images P1 to Pn.

Specifically, first, the correction amount detection unit 743 calculates positional deviation amounts $\Delta Dr=(X_r-X_R, Y_r-Y_R)$, $\Delta Dg=(X_g-X_G, Y_g-Y_G)$, and $\Delta Db=(X_b-X_B, Y_b-Y_B)$ between the corresponding positioning points in the spectral images Pr, Pg, and Pb and the spectral images $P_R$, $P_G$, and $P_B$ for generating a reference image (Step S26).

Then, the correction amount detection unit 743 calculates the average value of the positional deviation amounts ΔDr, ΔDg, and ΔDb to calculate the position correction amount ΔC (Step S27). That is, the position correction amount ΔC can be calculated by the following Expression (5).

$$\Delta C=(\Delta Dr+\Delta Dg+\Delta Db)/3 \qquad (5)$$

Then, the position correction unit 744 acquires corrected images P'1 to P'n obtained by correcting the spectral images P1 to Pn, using the position correction amount ΔC calculated by the correction amount detection unit 743 (Step S28). Specifically, the corrected images P'1 to P'n are acquired by subtracting the position correction amount ΔC from the pixel coordinates of each of the spectral images P1 to Pn.

The spectrum calculation unit 746 calculates spectral data for a position corresponding to the designated position (Step S29).

Operation and Effect of Fourth Embodiment

The color measurement system according to the fourth embodiment detects the positional deviation amount of the reference image which is displayed when the designated position is selected, using the spectral images Pr, Pg, and Pb with wavelengths corresponding to three-band images among the spectral images for measurement which are acquired after the designated position is selected, and positions the spectral images P1 to Pn for measurement, using the positional deviation amount. Therefore, it is possible to effectively perform positioning with high accuracy.

That is, when the designated position is specified, the user operates the terminal apparatus 7 with the measurement device 2 fixed to the measurement target X. At that time, when the user touches the measurement device 2, for example, when the user needs to fix the measurement device 2, positional deviation is likely to occur in the measurement device 2. During measurement, positional deviation is less likely to occur since the user does not perform an operation.

In contrast, in this embodiment, the spectral images P1 to Pn for measurement are positioned on the basis of the amounts of positional deviation between the spectral images $P_R$, $P_G$, and $P_B$ for generating a reference image which are acquired immediately before the designated position is detected and the spectral images Pr, Pg, and Pb for measurement which are acquired after the designated position is selected. Therefore, it is possible to correct the positional deviation between the pixels when the operator operates the measurement device 2.

The spectral images Pr, Pg, and Pb for measuring wavelengths corresponding to the spectral images $P_R$, $P_G$, and $P_B$ for generating a reference image which are used for positioning are substantially the same as or similar to the spectral images $P_R$, $P_G$, and $P_B$ for generating a reference image. Therefore, the same portion in the object to be captured is likely to be detected as the positioning points and the use of the positioning points makes it possible to perform positioning with high accuracy.

In the color measurement system according to the fourth embodiment, the selection of the positioning point is performed in a predetermined region smaller than the entire region of the spectral image, such as a predetermined inspection region or the color measurement region Ar2 having the pixel p at the designated position as its center.

When positional deviation involves a change in the inclination of the measurement target, it is difficult to position the entire image. In this embodiment, since positioning is performed in a predetermined limited region, it is possible to perform positioning in a predetermined region with high accuracy.

When the user specifies the designated position, the color measurement system according to the fourth embodiment acquires the spectral images for generating a reference image which have three wavelengths and displays the reference image, which is a composite image of the spectral images. When the designated position is detected in response to an input operation of the user who has selected the designated position while referring to the reference image, the color measurement system acquires the spectral images P1 to Pn for measurement.

In this way, it is possible to compose the spectral images for generating a reference image and to display the reference image which is the same as or similar to the measurement target on the display unit. Then, the user selects the designated position while referring to the reference image displayed on the display unit. Therefore, it is possible to appropriately and easily select a desired position of the measurement target as the designated position.

In particular, in this embodiment, even when the measurement position is not determined and the measurement device 2 is moved on the measurement target X, it is possible to reduce the power consumed for color measurement since the color measurement process is performed after a desired color measurement position is determined.

In order to generate the reference image, the color measurement system according to the fourth embodiment selects one wavelength from each of the wavelength bands corresponding to R, G, and B colors and acquires the spectral images for the selected three wavelengths (three bands). It is possible to compose the spectral images to generate an image which is the same as or similar to the measurement target.

When the three-band image is used as the reference image, it is possible to reduce the time required to capture the reference image. For example, when 50 reference images can be captured per second, the user can operate the spectrometer to display the reference image in real time while moving the spectrometer. The user can easily search for the measurement position.

Fifth Embodiment

Next, a fifth embodiment of the invention will be described.

In the fourth embodiment, the spectral images $P_R$, $P_G$, and $P_B$ for generating a reference image and the spectral images Pr, Pg, and Pb for measurement are compared to calculate the position correction amount $\Delta C$ and each of the spectral images for measurement is positioned.

In contrast, in the fifth embodiment, after the spectral images for measurement are acquired, comparative spectral images for comparison with the spectral images $P_R$, $P_G$, and $P_B$ for generating a reference image are acquired as the representative image. The comparative spectral images have wavelengths (for example, position deviation is about a measurement interval of 10 nm) that are equal to or close to those of the spectral images $P_R$, $P_G$, and $P_B$. Then, the spectral images for generating a reference image are compared with the comparative spectral images to calculate a position correction amount $\Delta C$ and each of the spectral images for measurement is positioned.

The color measurement system according to the fifth embodiment has the same operation as that according to the fourth embodiment except that it acquires the comparative spectral images and compares the comparative spectral images with the spectral images for generating a reference image to calculate the position correction amount $\Delta C$.

That is, as shown in FIG. 10, the user specifies a designated position while referring to a reference image (real time image) obtained by composing three-band spectral images $P_R$, $P_G$, and $P_B$ acquired by a measurement device 2 (Steps S21 to 23). Then, the measurement device 2 performs a process of acquiring the spectral images for measurement (Steps S1 to S5). When it is determined in Step S5 that the spectral images for all measured wavelengths have been acquired, the measurement device 2 acquires comparative spectral images $P'_R$, $P'_G$, and $P'_B$.

When the comparative spectral images $P'_R$, $P'_G$, and $P'_B$ are acquired, a positioning point selection unit 742 detects positioning points $C_R(X_R, Y_R)$, $C_R(X_R, Y_R)$, and $C_B(X_B, Y_B)$ from the spectral images $P_R$, $P_G$, and $P_B$, similarly to Step S24 in the fourth embodiment.

Then, the positioning point selection unit 742 detects positioning points $C'_R(X'_R, Y'_R)$, $C'_G(X'_G, Y'_G)$, and $C'_B(X'_B, Y'_B)$ from the comparative spectral images $P'_R$, $P'_G$, and $P'_B$.

The positioning points can be selected by the same method as that in the first to fourth embodiments.

Then, a correction amount detection unit 743 compares the spectral images $P_R$, $P_G$, and $P_B$ for generating a reference image and the comparative spectral images $P'_R$, $P'_G$, and $P'_B$ at the corresponding wavelengths and calculates the positional deviation amounts $\Delta Dr$, $\Delta Dg$, and $\Delta Db$ at the respective wavelength. Then, the correction amount detection unit 743 calculates the average value of the positional deviation amounts $\Delta Dr$, $\Delta Dg$, and $\Delta Db$ to calculate the position correction amount $\Delta C$.

A position correction unit 744 acquires corrected images P'1 to P'n obtained by correcting the spectral images P1 to Pn using the calculated position correction amount $\Delta C$ (Step S28).

A spectrum calculation unit 746 calculates the spectral data of a position corresponding to the designated position (Step S29).

Operation and Effect of Fifth Embodiment

The color measurement system according to the fifth embodiment sequentially acquires the spectral images $P_R$, $P_G$, and $P_B$ for generating a reference image, the spectral images P1 to Pn for measurement, and the comparative spectral images $P'_R$, $P'_G$, and $P'_B$. Then, the color measurement system compares the spectral images $P_R$, $P_G$, and $P_B$ for generating a reference image with the comparative spectral images $P'_R$, $P'_G$, and $P'_B$, to calculate the position correction amount $\Delta C$ common to all spectral images.

As described above, when the designated position is specified, positional deviation is likely to occur in the spectrometer since the user performs an operation. In this embodiment, the color measurement system compares the images with substantially the same characteristics to acquire the position correction amount before and after the selection of the designated position and performs positioning. Therefore, it is possible to effectively perform positioning with high accuracy.

In the fourth and fifth embodiments, the spectral images $P_R$, $P_G$, and $P_B$ for generating a reference image are compared with the spectral images with the corresponding wavelengths to calculate the position correction amount $\Delta C$ common to all spectral images Pk for measurement. However, the invention is not limited thereto.

That is, the spectral image in the red wavelength band, the spectral image in the green wavelength band, and the spectral image in the blue wavelength band may be corrected using the positional deviation amount $\Delta Dr$, the positional deviation amount $\Delta Dg$, and the positional deviation amount $\Delta Db$, respectively.

The position correction amount $\Delta C$ may be calculated by one or two of the positional deviation amounts $\Delta Dr$, $\Delta Dg$, and $\Delta Db$ and positioning may be performed.

The positioning points may be selected from the reference image and a composite image of the spectral images Pr, Pg, and Pb or the comparative spectral images $P'_R$, $P'_G$, and $P'_B$ and positioning may be performed.

Sixth Embodiment

Next, a sixth embodiment of the invention will be described.

In the fourth embodiment, the spectral images $P_R$, $P_G$, and $P_B$ for generating a reference image are compared with the spectral images Pr, Pg, and Pb for measurement to calculate the position correction amount $\Delta C$ and each of the spectral images for measurement is positioned.

In contrast, in the sixth embodiment, the spectral images $P_R$, $P_G$, and $P_B$ for generating a reference image and/or a reference image (real-time image) generated from the spectral images $P_R$, $P_G$, and $P_B$ for generating a reference image is compared with a first spectral image P1 which is initially captured among the spectral images for measurement to calculate the position correction amount ΔC and each of the spectral images for measurement is positioned. That is, the first spectral image P1 corresponds to the representative image according to the invention.

Next, a case in which the spectral image $P_R$ is compared with the first spectral image P1 will be described.

The color measurement system according to the sixth embodiment has the same operation as that according to the fourth embodiment except that the spectral image $P_R$ for generating a reference image is compared with the first spectral image P1 for measurement to calculate the position correction amount ΔC.

That is, as shown in FIG. 10, the user specifies a designated position while referring to a reference image (real time image) obtained by composing the three-band spectral images $P_R$, $P_G$, and $P_B$ acquired by a measurement device 2 (Steps S21 to 23). Then, the measurement device 2 performs a process of acquiring the spectral images for measurement (Steps S1 to S5).

Then, when the spectral images for all measured wavelengths are acquired in Step S5, a positioning point selection unit 742 selects a positioning point $C_R(X_R, Y_R)$ of the spectral image $P_R$ (Step S24).

That is, in this embodiment, it is preferable that the positioning point $C_R(X_R, Y_R)$ of the spectral image $P_R$ for generating a reference image which has a wavelength closest to the wavelength λ1 of the first spectral image P1 be selected in order to sequentially reduce the gap G1 between the reflective films 54 and 55 to acquire the spectral image Pk. In addition, another spectral image for generating a reference image may be used, depending on a measured wavelength band for spectrometry or the measured wavelength of the first spectral image. The positioning point may be detected from the reference image obtained by composing the spectral images for generating a reference image.

Then, in this embodiment, a positioning point selection unit 742 selects the positioning point $C1(X_1, Y_1)$ of the first spectral image P1.

The positioning point is selected by, for example, the same method as that in the first to fifth embodiments.

Then, a correction amount detection unit 743 compares the positioning point $C_R(X_R, Y_R)$ of the spectral image $P_R$ with the positioning point $C1(X_1, Y_1)$ of the first spectral image P1 to calculate the position correction amount ΔC common to the spectral images P1 to Pn.

That is, a positional deviation amount $ΔD1(X_1-X_R, Y_1-Y_R)$ between the first spectral image P1 and the spectral image $P_R$ is calculated as the position correction amount ΔC.

A position correction unit 744 acquires corrected images P'1 to P'n obtained by correcting the position of each of the spectral images P1 to Pn using the calculated position correction amount ΔC (Step S28). A spectrum calculation unit 746 calculates spectral data (Step S29).

Operation and Effect of Sixth Embodiment

In this embodiment, the first spectral image P1 which is initially acquired among the spectral images for measurement is compared with the spectral images for generating a reference image to calculate the position correction amount ΔC common to all spectral images. Therefore, it is possible to reduce the amount of calculation in positioning. As a result, it is possible to reduce a processing load and to improve a processing speed.

That is, the time from the acquisition of the spectral images $P_R$, $P_G$, and $P_B$ for generating a reference image to the acquisition of the first spectral image P1 for measurement is longer than the acquisition interval between the spectral images for measurement since a designated position detection operation, a measurement instruction operation, and a measurement start operation are performed. Therefore, the positional deviation amount between the spectral images $P_R$, $P_G$, and $P_B$ for generating a reference image and the first spectral image P1 is likely to be more than the positional deviation amount between the spectral images for measurement. While the spectral images for measurement are acquired, there is no user operation. Therefore, positional deviation is less likely to occur than until the first spectral image P1 is acquired. According to the configuration in which the spectral images $P_R$, $P_G$, and $P_B$ for generating a reference image are compared with the first spectral image P1 to calculate the position correction amount ΔC common to all spectral images, it is possible to prevent the influence of positional deviation in a section with the largest positional deviation amount. In addition, it is possible to reduce the amount of calculation in positioning and the processing load and to improve the processing speed. Therefore, it is possible to effectively perform positioning with high accuracy.

Seventh Embodiment

Next, a seventh embodiment of the invention will be described.

In the fifth and sixth embodiments, the spectral images $P_R$, $P_G$, and $P_B$ for generating a reference image and/or the reference image (real-time image) generated from the spectral images $P_R$, $P_G$, and $P_B$ is compared with the first spectral image P1 which is initially captured among the spectral images for measurement to calculate the position correction amount ΔC and the position of each spectral image for measurement is corrected.

In contrast, in this embodiment, the spectral images $P_R$, $P_G$, and $P_B$ for generating a reference image and/or the reference image (real-time image) generated from the spectral images $P_R$, $P_G$, and $P_B$ is compared with the first spectral image P1 which is initially captured among the spectral images for measurement to calculate a position correction amount and the coordinates of the designated position in the spectral image for measurement are calculated from the coordinates of the designated position in the reference image and the positional deviation amount.

Next, in this embodiment, similarly to in the sixth embodiment, a case in which the spectral image $P_R$ is compared with the first spectral image P1 will be described.

A color measurement system according to this embodiment has the same operation as that according to the sixth embodiment except that it calculates the coordinates of the designated position in each spectral image from a positional deviation amount ΔD1 between the spectral image $P_R$ for generating a reference image and the first spectral image P1 for measurement.

That is, as shown in FIG. 10, the user specifies the designated position while referring to the reference image (real-time image) obtained by composing three-band spectral images $P_R$, $P_G$, and $P_B$ captured by a measurement device 2 (Steps S21 to 23). Then, the measurement device 2 performs a process of acquiring the spectral images for measurement (Steps S1 to S5).

When the spectral images for all measured wavelengths are acquired in Step S5, a positioning point selection unit 742 selects a positioning point $C_R$ of the spectral image $P_R$, similarly to in the sixth embodiment (Step S24).

In addition, the positioning point selection unit 742 selects a positioning point C1 of the first spectral image P1.

A correction amount detection unit 743 calculates the positional deviation amount ΔD1 between the positioning point $C_R$ of the spectral image $P_R$ and the positioning point C1 of the first spectral image P1 as the position correction amount ΔC.

Then, in this embodiment, a position correction unit 744 calculates the coordinates of the designated position in each of the spectral images P1 to Pn using the calculated position correction amount ΔC.

Specifically, since the position correction amount ΔC is the amount of movement from the reference image to the first spectral image P1, the coordinates of the designated position in the first spectral image P1 are calculated by adding the position correction amount ΔC to the coordinates of a pixel P at the designated position in the reference image. The coordinates of the designated position in each of the spectral images P1 to Pn are calculated.

A spectrum calculation unit 746 calculates the average value of the received light intensities at the designated positions in the spectral images P1 to Pn, using the calculated coordinates of the designated positions, and calculates spectral data (Step S29).

Operation and Effect of Seventh Embodiment

In this embodiment, similarly to in the sixth embodiment, the first spectral image P1 which is initially acquired among the spectral images for measurement is compared with the spectral images $P_R$, $P_G$, and $P_B$ for generating a reference image to calculate the position correction amount ΔC. Therefore, it is possible to further reduce the amount of calculation in positioning. As a result, it is possible to reduce a processing load and to improve a processing speed.

In this embodiment, the position correction amount ΔC is added to the coordinates of the designated position in the reference image to calculate the coordinates of the designated position in each of the spectral images P1 to Pn for measurement, thereby performing positioning. Therefore, it is possible to further reduce the amount of calculation in positioning. As a result, it is possible to reduce a processing load and to improve a processing speed.

In this embodiment, the position correction amount Δ=ΔD1 which is calculated on the basis of the positioning points in the spectral image (reference image) for generating a reference image and the first spectral image is used to correct the coordinates of the designated position. However, the invention is not limited thereto. That is, the coordinates of the designated position may be corrected using any position correction amount described in the first to sixth embodiments.

In the sixth and seventh embodiments, when the first spectral image P1 is compared with the spectral images $P_R$, $P_G$, and $P_B$ for generating a reference image, the first spectral image P1 is compared with the spectral image $P_R$ with a wavelength closest to the wavelength of the first spectral image P1. However, the invention is not limited thereto.

That is, the first spectral image P1 may be compared with two or all of the spectral images $P_R$, $P_G$, and $P_B$, or it may be compared with the reference image as one image. In addition, as in the above-described embodiment, the number of images to be compared is reduced to reduce the processing load when the position correction amount ΔC is calculated.

In the sixth and seventh embodiments, the first spectral image P1 may be positioned relative to the reference image (the spectral images for generating a reference image) and the spectral images P2 to Pn for measurement other than the first spectral image P1 may be sequentially positioned on the basis of the positional deviation amount between the spectral images having the closest wavelength therebetween, that is, in the order of measurement, as described in the first embodiment.

Eighth Embodiment

Next, an eighth embodiment of the invention will be described with reference to the drawings.

In the above-described embodiments, the positioning points are selected on the basis of the received light intensity of the spectral images and the positioning points between the spectral images are positioned.

In contrast, a color measurement system 1B according to this embodiment has a configuration which physically detects the rotation of a measurement device using a gyro sensor as an angle variation detection unit and performs positioning on the basis of the detection result, in addition to the configuration of the color measurement system 1 according to the second embodiment.

Figure 11:
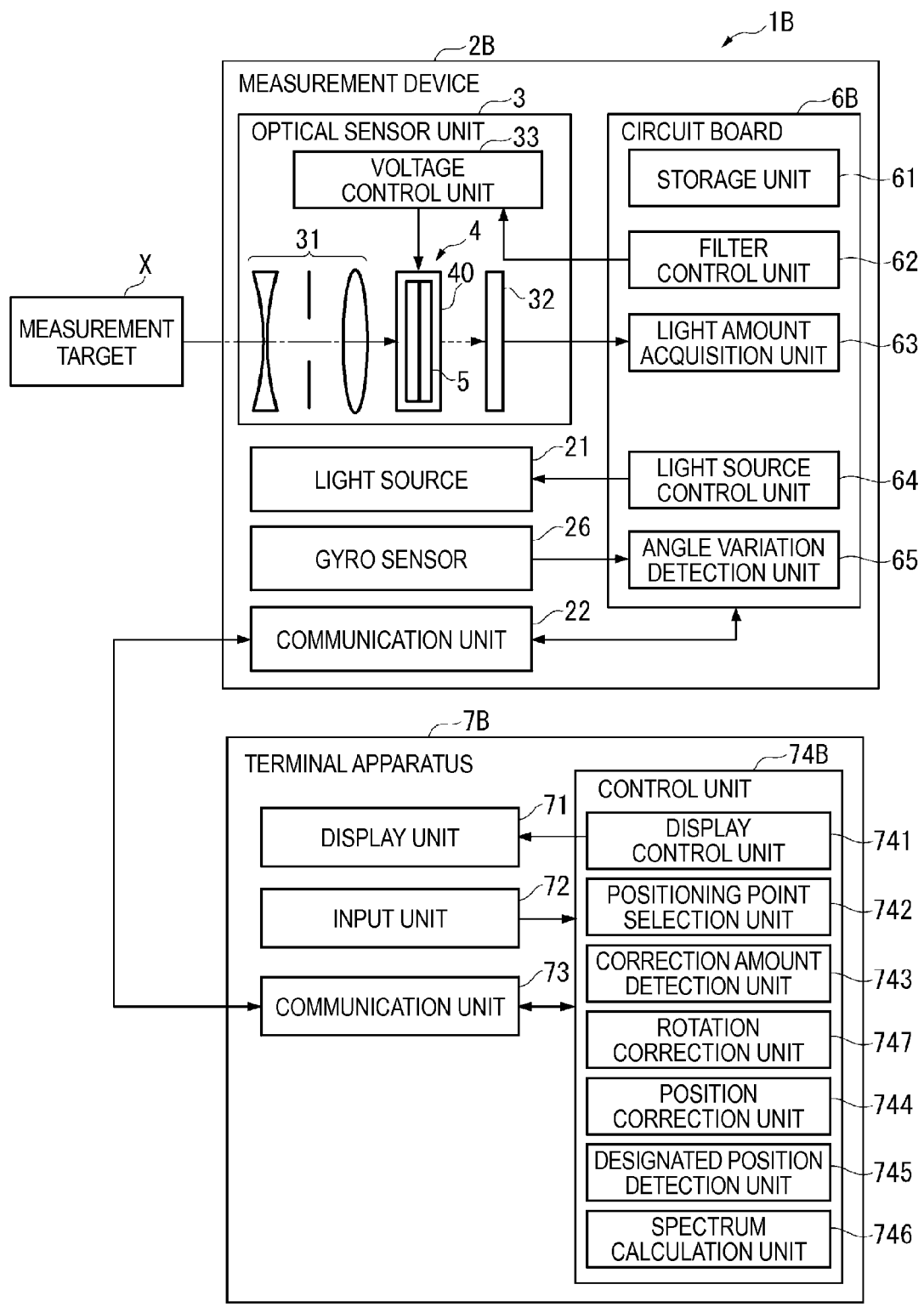
FIG. 11 is a block diagram illustrating the schematic configuration of a color measurement system according to a sixth embodiment of the invention.

FIG. 11 is a block diagram illustrating the schematic configuration of the color measurement system 1B according to the eighth embodiment of the invention. As shown in FIG. 11, the color measurement system 1B basically has the same configuration as that according to the fourth embodiment except that a measurement device 2B includes a gyro sensor 26, a circuit board 6B includes an angle variation detection unit 65, and a terminal apparatus 7B includes a control unit 74B including a rotation correction unit 747. Therefore, in the following description, the same components as those in the fourth embodiment are denoted by the same reference numerals and the description thereof will be omitted or simplified.

The gyro sensor 26 is a position change detection unit which detects a change in the position of a measurement target X and particularly detects the rotation of the measurement device 2B with respect to the measurement target X.

The angle variation detection unit 65 detects a variation in the angle of the measurement device 2B on the basis of the detection result of the gyro sensor 26.

The rotation correction unit 747 performs a process of correcting the rotation of a spectral image using the angle variation to acquire a rotation corrected image.

Operation of Color Measurement System

Figure 12:
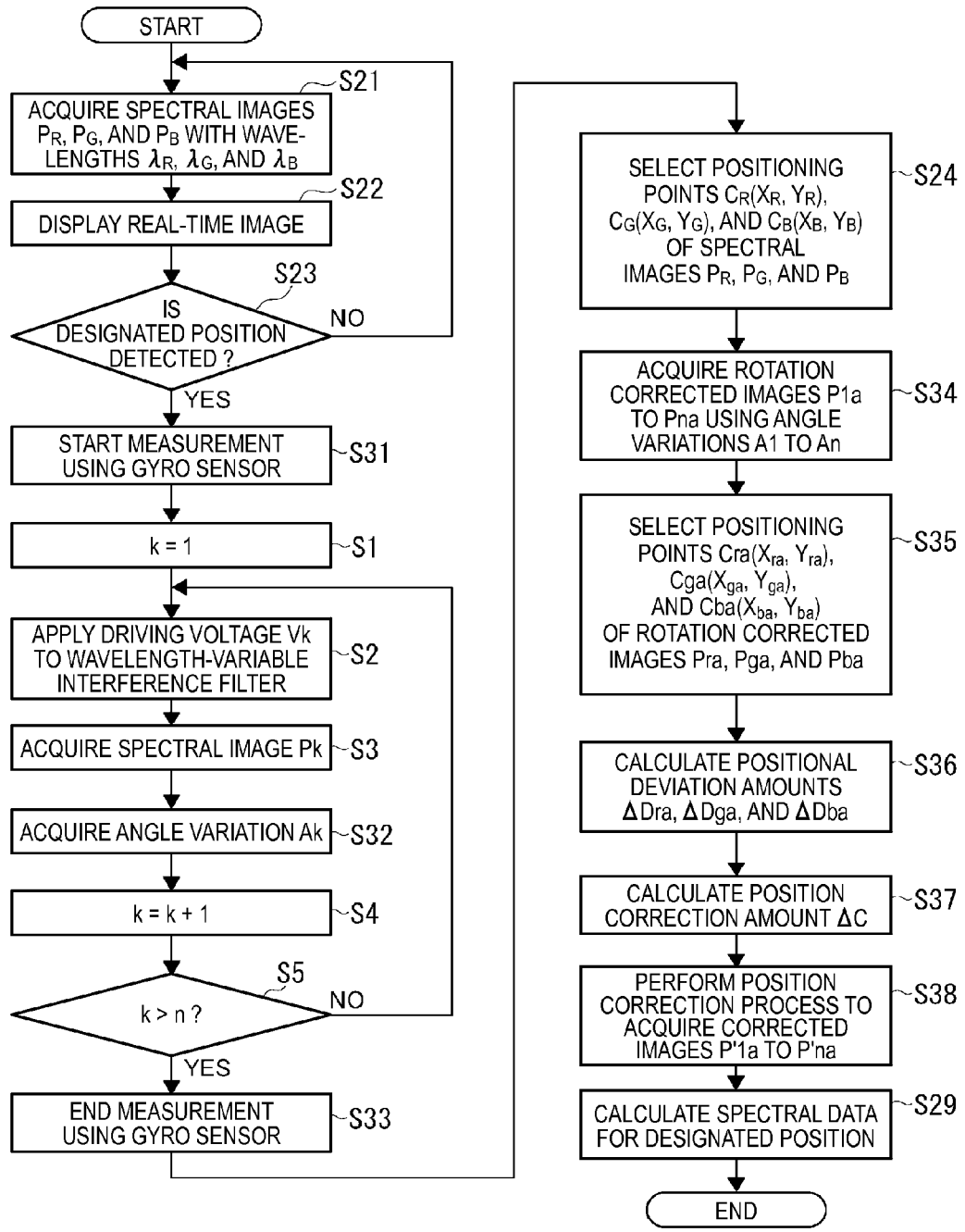
FIG. 12 is a flowchart illustrating a process of the color measurement system according to the sixth embodiment.

FIG. 12 is a flowchart illustrating the operation of the color measurement system 1B.

The color measurement system according to this embodiment has the same operation as that according to the fourth embodiment except that it corrects the rotation of the spectral image on the basis of the detection result of the gyro sensor 26.

That is, as shown in FIG. 12, the user specifies a designated position while referring to a reference image (real time image) obtained by composing three-band spectral images $P_R$, $P_G$, and $P_B$ acquired by a measurement device 2 (Steps S21 to 23).

When the designated position is detected, the terminal apparatus 7B instructs the measurement device 2B to start a process of acquiring spectral images for color measurement.

When receiving the instruction to start the color measurement process, the measurement device 2B starts the measurement of a rotation angle using the gyro sensor 26 (Step S31).

A process of acquiring spectral images for measurement is performed. That is, first, a filter control unit 62 initializes a set variable k (k=1) (Step S1) and controls a voltage control unit 33 such that the read driving voltage Vk is applied to an electrostatic actuator 56 of a wavelength-variable interference filter 5 (Step S2). When the driving voltage Vk is applied to the electrostatic actuator 56, a gap G1 between reflective films is changed, light with a measured wavelength passes through the wavelength-variable interference filter 5, and a spectral image Pk with a measured wavelength λ1 is acquired (Step S3).

In this embodiment, when the spectral image Pk is acquired, the angle variation detection unit 65 detects a variation Ak in the angle of the measurement device 2B with respect to the measurement target X, on the basis of the amount of rotation of the measurement device 2B with respect to the measurement target X which is detected by the gyro sensor 26 (Step S32).

Then, when the spectral image Pk and the angle variation Ak are acquired, the filter control unit 62 adds 1 to the variable k (k=k+1) (Step S4). Then, the filter control unit 62 determines whether k>n is satisfied (Step S5). When k≤n is satisfied, the process returns to Step S2. When k>n is satisfied, the measurement of the amount of rotation by the gyro sensor 26 ends (Step S33).

In this embodiment, similarly to in the fourth embodiment, positioning is performed using the spectral images $P_R$, $P_G$, and $P_B$ for generating a reference image as standard images.

First, a positioning point selection unit 742 selects positioning points $C_R(X_R, Y_R)$, $C_G(X_G, Y_G)$, and $C_B(X_B, Y_B)$ of the spectral images $P_R$, $P_G$, and $P_B$, similarly to in the fourth embodiment (Step S24).

Then, the rotation correction unit 747 performs a process of correcting the rotation of the spectral image Pk (k=1 to n) using the angle variation Ak (k=1 to n) to acquire the rotation corrected image Pka (Step S34). The rotation correction process corrects the distortion of an image or positional deviation caused by a change in the angle of the measurement device 2, using the angle variation Ak.

The positioning point selection unit 742 selects positioning points $Cra(X_{ra}, Y_{ra})$, $Cga(X_{ga}, Y_{ga})$, and $Cba(X_{ba}, Y_{ba})$ of the rotation corrected images Pra, Pga, and Pba, which are acquired by performing the rotation correction process for spectral images Pr, Pg, and Pb with wavelengths λr, λg, and λb that are equal or closest to wavelengths $\lambda_R$, $\lambda_G$, and $\lambda_B$, from all measured wavelengths λ1 to Xn (Step S35). The positioning points are selected by the same method as that in the above-described embodiments.

Then, a correction amount detection unit 743 calculates a position correction amount ΔC common to the spectral images P1 to Pn.

Specifically, first, the correction amount detection unit 743 calculates positional deviation amounts $\Delta Dra=(X_{ra}-X_R, Y_{ra}-Y_R)$, $\Delta Dga=(X_{ga}-X_G, Y_{ga}-Y_G)$, and $\Delta Dba=(X_{ba}-X_B, Y_{ba}-Y_B)$ between the corresponding positioning points in the rotation corrected images Pra, Pga, and Pba and the spectral images $P_R$, $P_G$, and $P_B$ for generating a reference image (Step S36).

Then, the correction amount detection unit 743 calculates the average value of the positional deviation amounts ΔDra, ΔDga, and ΔDba to calculate the position correction amount ΔC (Step S37). That is, the position correction amount ΔC can be calculated by the following Expression (6).

$$\Delta C=(\Delta Dra+\Delta Dga+\Delta Dba)/3 \tag{6}$$

Then, a position correction unit 744 acquires corrected images P'1a to P'na obtained by correcting the rotation corrected images P1a to Pna, using the position correction amount ΔC calculated by the correction amount detection unit 743 (Step S38). Specifically, the corrected images P'1a to P'na are obtained by subtracting the position correction amount ΔC from the coordinates of the pixels in the spectral images P1a to Pna.

Then, a spectrum calculation unit 746 calculates spectral data for a position corresponding to the designated position (Step S29).

Effect and Operation of Eighth Embodiment

In the color measurement system 1B according to this embodiment, positional deviation can be physically detected. Therefore, it is possible to perform positioning with high accuracy.

In particular, since the gyro sensor which detects an angle variation is used as a positional deviation detection unit, it is possible to perform positioning, considering a change in the spectral image caused by an angle variation.

That is, when the angle of the measurement device 2 with respect to the measurement target X is changed, there may be a case in which the spectral image after the change has a size smaller than the spectral image before the change. It is difficult to analyze the spectral image to detect the change in the image caused by the change in the angle.

In this embodiment, since positioning is performed using the angle variation Ak detected by the gyro sensor 26, it is possible to further improve the accuracy of positioning.

In particular, in this embodiment, only the gyro sensor 26 which detects the angle variation Ak is provided as means for physically detecting positional deviation. This embodiment is configured such that a change in the angle is corrected using the detected angle variation Ak and positioning is performed using the positioning points for positional deviation in the plane direction parallel to the measurement target X. Therefore, it is possible to accurately perform positioning with a simple configuration and to provide a high-performance color measurement system at a low cost.

In this embodiment, the angle variation Ak is detected in order for all spectral images Pk to acquire the rotation corrected images. However, the invention is not limited thereto. Only an angle variation A1 for the first spectral image P1 may be detected and the rotation of all spectral images Pk may be corrected using the angle variation A1.

In addition, an angle variation Ai for a predetermined spectral image Pi may be acquired and rotation may be corrected using the angle variation Ai. For example, angle variations $A_R$, $A_G$, and $A_B$ for the spectral images $P_R$, $P_G$, and $P_B$ may be acquired and rotation may be corrected using a correction amount common to all spectral images Pk. The rotation of a spectral image in a red wavelength band may be corrected using the angle variation $A_R$, the rotation of a spectral image in a green wavelength band may be corrected using the angle variation $A_G$, and the rotation of a spectral image in a blue wavelength band may be corrected using the angle variation $A_B$.

In this embodiment, only the gyro sensor 26 is provided. However, any sensor serving as a position change detection unit which detects a change in the position of the measurement device relative to the measurement target X, such as an acceleration sensor or a focal length detection device, may be provided.

In this embodiment, the spectral image for measurement whose rotation has been corrected using the angle variation Ak detected by the gyro sensor 26 is positioned using the positioning point which is selected on the basis of received light intensity. However, the positioning between the spectral images may be performed using a change in the posture or position of the measurement device which is detected by the position change detection unit. In this case, it is possible to perform positioning with high accuracy.

Modification Examples of Embodiments

The invention is not limited to the above-described embodiments and modification examples and improvements in the range capable of achieving the object of the invention are also included in the invention.

For example, in the above-described embodiments, the color measurement system including the measurement device and the terminal apparatus is given as an example of the spectrometer according to the invention. However, the invention is not limited thereto. The measurement device and the terminal apparatus may be integrated with each other.

In the above-described embodiments, the pixel with the largest difference in received light intensity is used as the positioning point. However, the invention is not limited thereto. A pixel with the highest received light intensity may be used as the positioning point.

The point where received light intensity is the highest is likely to be a bright point. At the bright point, the amount of light is large at a plurality of wavelengths. Therefore, when the point with the highest received light intensity is used as the positioning point, it is possible to select the same positioning point in a wide wavelength range and to improve the accuracy of positioning.

A pixel with received light intensity equal to or greater than a first predetermined threshold value may be selected as the positioning point.

When the pixel with received light intensity equal to or greater than the first predetermined threshold value is selected as the positioning point, it is possible to set a plurality of positioning points. When there are a plurality of bright points, a bright point with the largest amount of light is likely to vary depending on wavelength. In contrast, when a plurality of points that are equal to or greater than the threshold value are used as the positioning points, it is possible to further improve the accuracy of positioning.

In addition to the point with the largest difference in received light intensity between adjacent pixels, a point having a difference in received light intensity equal to or greater than a second threshold value between adjacent pixels may be used as the positioning point.

The pixel having a difference in received light intensity equal to or greater than the second threshold value between adjacent pixels is a pixel with the high rate of change in received light intensity, that is, an edge portion (outline portion) of the spectral image. The edge appears at the same position, regardless of the wavelength of the spectral image. Since the pixel having an intensity difference equal to or greater than the second threshold value between adjacent pixels is used as the positioning point, it is possible to perform positioning with a plurality of edge portions and to perform the positioning between the spectral images with high accuracy.

Therefore, it is possible to use a plurality of pixels as the positioning points in terms of the difference in received light intensity between adjacent pixels and to further improve the accuracy of positioning.

The difference in received light intensity is not limited to the difference in received light intensity between adjacent pixels. For example, a difference in received light intensity between pixels which are arranged at an interval of one or two pixels may be used. When the difference in received light intensity between several pixels is referred to, it is possible to effectively detect an edge portion (outline portion) common to the spectral images and to effectively perform positioning between the spectral images with high accuracy. As such, since a variation in several pixels is referred to, it is possible to reduce the amount of calculation for selecting the positioning point and to reduce a processing load.

A method of selecting the positioning point from a section in which the variation is at a maximum or is equal to or greater than a threshold value is not particularly limited. For example, pixels which are disposed at both ends of a section or at the center of the section, or a pixel with the highest received light intensity may be used as the positioning point.

In the above-described embodiments, the point having the largest difference in received light intensity between adjacent pixels is used as the positioning point. However, the invention is not limited thereto.

For example, when a first pixel, a second pixel, and a third pixel are consecutive in one direction, a difference value between a difference in received light intensity between the first pixel and the second pixel and a difference in received light intensity between the second pixel and the third pixel is calculated as an adjacent intensity difference in the second pixel. Then, pixels with the smallest adjacent intensity difference among the pixels which are arranged in one direction are extracted and a pixel with the highest received light intensity among the extracted pixels is selected as the positioning point.

FIG. 13 is a table illustrating the received light intensity of each pixel forming a given row of a given spectral image Pk, a difference in received light intensity between adjacent pixels, and a difference between adjacent received light intensity differences (adjacent intensity difference). The adjacent intensity difference is a difference value between the received light intensity differences between adjacent pixels among three pixels which are consecutively arranged in the row direction.

Figure 14A:
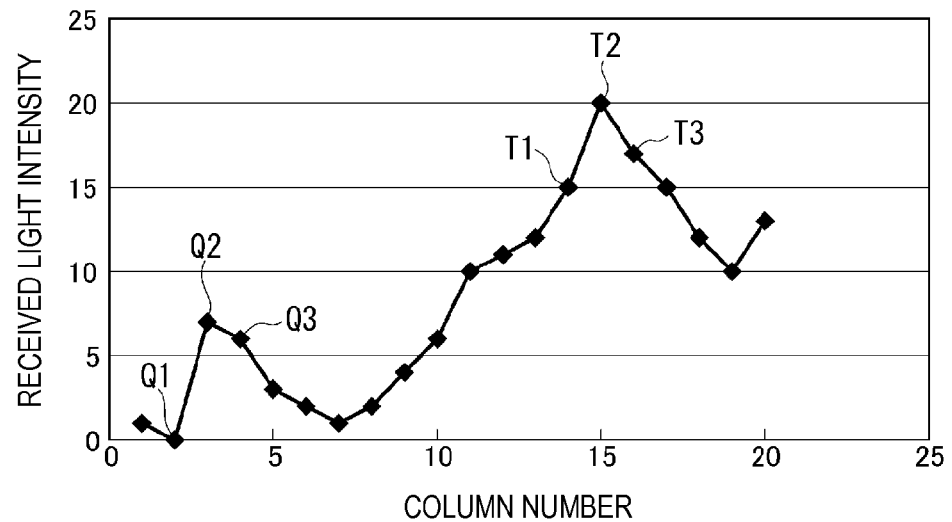
FIGS. 14A and 14B are graphs illustrating the relationship between the received light intensity and the positioning point.
Figure 14B:
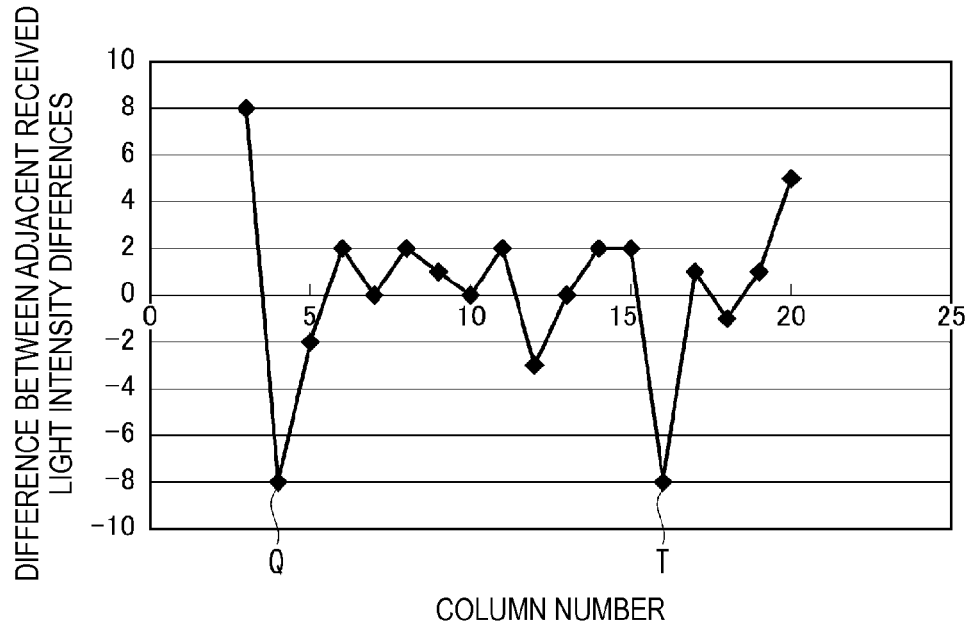

FIG. 14A is a graph illustrating the received light intensity shown in FIG. 13 and FIG. 14B is a graph illustrating the difference between adjacent received light intensity differences shown in FIG. 13.

As shown in FIG. 14B, the value of points Q and T with the smallest difference between adjacent received light intensity differences is −8. As can be seen from FIG. 13, the point Q indicates the difference (adjacent intensity difference) between adjacent received light intensity differences among the pixels with column numbers 2, 3, and 4 and the point T indicates the difference between adjacent received light intensity differences among the pixels with column numbers 14, 15, and 16. In FIG. 14A, points with column numbers 2, 3, 4, 14, 15, and 16 are points Q1, Q2, Q3, T1, T2, and T3. As shown in FIG. 13 and FIG. 14A, among the points, a point with the highest received light intensity is the point T2, that is, a pixel with column number 15, and is used as the positioning point.

As shown in FIG. 14A, the points Q1, Q2, and Q3 and the points T1, T2, and T3 are positions which cross the peaks of the received light intensity and the points Q2 and T2 are peak positions. That is, the pixel with the smallest adjacent intensity difference is likely to form an edge portion (outline) with a large light value. The pixel with the highest received light intensity in the edge portion is likely to be disposed on the edge portion. Therefore, the pixel is likely to be a point with the large amount of light, regardless of wavelength, and is selected as the positioning point. As a result, it is possible to further improve the accuracy of positioning.

In the above-described embodiments, positioning is certainly performed for the detected positional deviation. However, the invention is not limited thereto. The color measurement system may be configured such that positioning may be performed for a spectral image with a positional deviation amount greater than a predetermined value.

The predetermined value is appropriately set, according to, for example, the accuracy of measurement, a measurement target, and the specifications of the spectrometer.

Since positioning is performed for the spectral image with a positional deviation amount greater than the predetermined value, the image which does not require positioning is not positioned. Therefore, it is possible to reduce the amount of calculation for the positioning process. As a result, it is possible to reduce the processing load of the spectrometer and the processing time.

In the fourth to sixth embodiments, as the representative images to be compared with the reference image or the spectral images for generating a reference image, different images are used. For example, the following images are used: the spectral image for measurement which has a wavelength substantially equal to that of the spectral image for generating a reference image; the comparative spectral image with a wavelength substantially equal to that of the spectral image for generating a reference image; and the first spectral image. The invention is not limited thereto. For example, among the representative images, two or more types of representative images maybe selected at the same time. That is, the spectral image for measurement which has a wavelength substantially equal to that of the spectral image for generating a reference image and the first spectral image may be used as the representative images, the positioning points maybe selected from each representative image, and positioning may be performed.

In the above-described embodiments, the wavelength-variable interference filter 5 is used as the spectral element. However, the invention is not limited thereto. For example, a spectral filter which can perform surface spectrometry, such as a liquid crystal tunable filter or AOTF, may be used.

In the above-described embodiments and modification examples, the wavelength-variable interference filter 5 has the configuration in which the fixed reflective film 54, which is the first reflective film, is provided on the fixed substrate 51, which is the first substrate, and the movable reflective film 55, which is the second reflective film, is provided on the movable substrate 52, which is the second substrate. However, the invention is not limited thereto. For example, the first substrate or the second substrate may not be provided.

In this case, for example, a first electrode, the first reflective film, a gap spacer, the second reflective film, and a second electrode are laminated on one surface of a substrate, the first reflective film faces the second reflective film with a gap therebetween, and the first electrode faces the second electrode with a gap therebetween. In the configuration, since one substrate is used, it is possible to further reduce the thickness of the spectral element. In addition, the first electrode may be provided on the first reflective film and the second electrode may be provided on the second reflective film.

In the above-described embodiments and modification examples, the light source 21 is provided. However, the measurement target X is limited to a self-light-emitting device, and the light source 21 may not necessarily be provided.

In the above-described embodiments, the telecentric optical system 31 is provided. However, the invention is not limited thereto. A light guide optical system which can guide light from a measurement target image to the spectral filter may be provided. For example, a light control film (LCF) may be provided.

The detailed configurations for carrying out the invention may be formed by appropriate combinations of the above-described embodiments and modification examples in the range capable of achieving the object of the invention and they may be appropriately changed to other configurations.

The entire disclosure of Japanese Patent Application No. 2013-045072 filed on Mar. 7, 2013 is expressly incorporated by reference herein.

What is claimed is:

1. A spectrometer comprising:
a spectral element that can change a wavelength of selected light and disperses light from an object;
an imaging unit that receives light components with a plurality of wavelengths which are dispersed by the spectral element and acquires a plurality of spectral images;
a positional deviation amount detection unit that selects a standard image from the plurality of spectral images acquired by the imaging unit and detects a positional deviation amount of a pixel position which receives light from a predetermined position of the object between the standard image and at least one of the spectral images other than the standard image; and
a positioning unit that positions the spectral images other than the standard image on the basis of the positional deviation amount detected by the positional deviation amount detection unit.

2. The spectrometer according to claim 1,
wherein the positional deviation amount detection unit includes:
a positioning point selection unit that selects, as a positioning point, the pixel position which receives light from the predetermined position of the object, on the basis of received light intensity of each pixel in the spectral image; and
a positional deviation amount measurement unit that measures a positional deviation amount between the positioning point in the standard image and the positioning points in the spectral images other than the standard image.

3. The spectrometer according to claim 2,
wherein the positioning point selection unit selects, as the positioning point, a pixel with the highest received light intensity in each spectral image.

4. The spectrometer according to claim 2,
wherein the positioning point selection unit selects, as the positioning point, a pixel with a received light intensity equal to or greater than a first predetermined threshold value in each spectral image.

5. The spectrometer according to claim 2,
wherein the positioning point selection unit selects, as the positioning point, at least one of two pixels with the largest difference in the received light intensity therebetween in each spectral image.

6. The spectrometer according to claim 2,
wherein, when a first pixel, a second pixel, and a third pixel are consecutively arranged in one direction, the positioning point selection unit calculates a difference value between a difference in received light intensity between the first pixel and the second pixel and a difference in received light intensity between the second pixel and the third pixel as an adjacent intensity difference in the second pixel, extracts pixels with the smallest adjacent intensity difference among the pixels which are arranged in the one direction in each spectral image, and selects a pixel with the highest received light intensity among the extracted pixels as the positioning point.

7. The spectrometer according to claim 2,
wherein the positioning point selection unit selects a plurality of the positioning points, and
the positioning unit performs positioning such that a sum of distances between a plurality of corresponding positioning points after the positioning is the minimum.

8. The spectrometer according to claim 1, further comprising:
a designated position detection unit that detects a designated position in the spectral image,
wherein the positioning unit performs positioning for the positioning point which is included in a predetermined region including the designated position of the spectral image.

9. The spectrometer according to claim 1,
wherein the positional deviation amount detection unit detects the positional deviation amount between the spectral images in a predetermined wavelength range, and
the positioning unit performs positioning between the spectral images in the predetermined wavelength range.

10. The spectrometer according to claim 1,
wherein the positioning unit performs positioning for the spectral image with a positional deviation amount greater than a predetermined value.

11. The spectrometer according to claim 1, further comprising:
a display unit that displays an image;
a display control unit that displays, on the display unit, a reference image obtained by composing the spectral images with at least three wavelengths which are acquired by the imaging unit; and
a designated position detection unit that detects a designated position which is specified by an input operation of a user in the reference image displayed on the display unit,
wherein the imaging unit acquires spectral images corresponding to a plurality of wavelengths in a region including the designated position,
the positional deviation amount detection unit detects the positional deviation amount between the standard image and a spectral image for generating the reference image, using at least one of the spectral image and the reference image as the standard image, and
the positioning unit performs positioning for the spectral image on the basis of the detected positional deviation amount.

12. The spectrometer according to claim 11,
wherein the display control unit displays, on the display unit, the reference image obtained by composing three spectral images for generating the reference image.

13. The spectrometer according to claim 11,
wherein the positional deviation amount detection unit acquires, as a representative image, the plurality of spectral images and/or a composite image of the spectral images and detects a positional deviation amount between the standard image and the representative image, and
the positioning unit performs positioning for the spectral images on the basis of the detected positional deviation amount.

14. The spectrometer according to claim 13,
wherein the representative image is the spectral image which has substantially the same wavelength as the spectral image for generating the reference image.

15. The spectrometer according to claim 13,
wherein the representative image is a composite image of three spectral images which have substantially the same wavelengths as at least three spectral images for generating the reference image.

16. The spectrometer according to claim 13,
wherein the imaging unit sequentially acquires the plurality of spectral images, and
the representative image is the spectral image which is initially acquired among the sequentially acquired spectral images.

17. The spectrometer according to claim 13,
wherein the imaging unit acquires a comparative spectral image which has the same wavelength as the spectral image for generating the reference image after acquiring the plurality of spectral images, and
the representative image is the comparative spectral image.

18. The spectrometer according to claim 11,
wherein the imaging unit sequentially acquires the plurality of spectral images,
the positional deviation amount detection unit detects the positional deviation amount between the standard image and the spectral image which is initially acquired among the sequentially acquired spectral images and the positional deviation amount between the spectral image and the next spectral image which is acquired after the spectral image, and
the positioning unit performs positioning between the standard image and the initially acquired spectral image and performs positioning between the spectral image and the next spectral image which is acquired after the spectral image for the spectral images which are acquired after the initially acquired spectral image.

19. The spectrometer according to claim 11,
wherein the positioning unit calculates a position corresponding to the designated position in each spectral image on the basis of the positional deviation amount.

20. The spectrometer according to claim 1,
wherein the positional deviation amount detection unit includes a position change detection unit that detects a change in a position relative to a measurement target and detects the positional deviation amount on the basis of the change in the position.

* * * * *